(12) United States Patent
Aragane et al.

(10) Patent No.: US 8,515,130 B2
(45) Date of Patent: Aug. 20, 2013

(54) CONFERENCE SYSTEM, MONITORING SYSTEM, IMAGE PROCESSING APPARATUS, IMAGE PROCESSING METHOD AND A NON-TRANSITORY COMPUTER-READABLE STORAGE MEDIUM

(75) Inventors: Kuniaki Aragane, Tokyo (JP); Kyoji Yoshino, Tokyo (JP); Koji Inagaki, Tokyo (JP)

(73) Assignee: Dai Nippon Printing Co., Ltd, Tokyo (JP)

(*) Notice: Subject to any disclaimer, the term of this patent is extended or adjusted under 35 U.S.C. 154(b) by 138 days.

(21) Appl. No.: 13/273,872

(22) Filed: Oct. 14, 2011

(65) Prior Publication Data
US 2012/0093365 A1    Apr. 19, 2012

(30) Foreign Application Priority Data

Oct. 15, 2010    (JP) ................. P2010-233080

(51) Int. Cl.
*G06K 9/00*    (2006.01)
*H04N 7/14*    (2006.01)

(52) U.S. Cl.
USPC ........................... 382/103; 348/14.08

(58) Field of Classification Search
USPC ...... 382/103, 162, 232, 276, 307; 348/14.08, 348/14.09, 14.1, 36, 38, 39, 143, 144, 169–172; 358/530

See application file for complete search history.

(56) References Cited

U.S. PATENT DOCUMENTS

| 6,611,282 B1 * | 8/2003 | Trubko et al. ............. 348/36 |
| 7,831,086 B2 * | 11/2010 | Kondo et al. ............. 382/154 |

FOREIGN PATENT DOCUMENTS

JP    2008-301034    12/2008

\* cited by examiner

*Primary Examiner* — Abolfazl Tabatabai
(74) *Attorney, Agent, or Firm* — Young & Thompson

(57) ABSTRACT

To provide a conference system, a monitoring system, an image processing apparatus, an image processing method and A non-transitory computer-readable storage medium that stores a computer-image processing program capable of accurately and effectively recognizing an object based on a fisheye-distorted image photographed at a wide angle.

When an instruction of selecting an arbitrary point $C_i(u_i, v_i)$ of a 2D-viewable planar regular image generated based on a fisheye-distorted image S photographed by a fisheye lens is received, point $S_i(x_i, y_i)$ on the fisheye-distorted image S is calculated as a coordinate corresponding to $C_i(u_i, v_i)$, and a pixel information group configuring the planar regular image is newly generated based on a pixel information group configuring the fisheye-distorted image S.

11 Claims, 22 Drawing Sheets

(A)

(B)

(C)

(A)

(B)

(A)

(B)

(A)

(B)

(A)

(B)

(A)

(B)

(C)

(A)

(B)

(C)

(A)

(B)

(C)

(D)

(E)

(A)

(B)

(A)

(B)

(A)

(B)

(1)

(2)

(3)

(4)

(C)

(A)

(B)

(C)

(D)

(A)

(B)

(C)

(A)

(B)

(C)

(D)

(E)

CONFERENCE SYSTEM, MONITORING SYSTEM, IMAGE PROCESSING APPARATUS, IMAGE PROCESSING METHOD AND A NON-TRANSITORY COMPUTER-READABLE STORAGE MEDIUM

BACKGROUND OF THE INVENTION

1. Field of the Invention

The present invention relates to an image processing apparatus and an image processing method for processing input image data.

2. Description of the Related Art

A wide-angle lens (such as fisheye lens) or omnidirectional mirror can photograph a subject at a wide angle, and thus is applied to a camera device (such as fisheye lens camera) in a monitoring camera system or TV conference system.

A distortion occurs in a fisheye-distorted image photographed by the fisheye lens camera and a significant distortion occurs particularly in an outer edge (end face) of the image. In order to enhance a discrimination between subjects in the fisheye-distorted image, there is performed a fisheye correction processing for converting a fisheye-distorted image into a 2D-viewable planar regular image and correcting the distortion.

As a technique employing the fisheye correction processing, Japanese Patent Application Laid-Open No. 2008-301034 Publication discloses therein a technique for outputting and displaying a size-reduced image of a fisheye lens's total scene and a cut-out distortion-corrected area of a desired area in the fisheye-distorted image designated by a pointing device on the same screen.

SUMMARY OF THE INVENTION

With the technique disclosed in Japanese Patent Application Laid-Open No. 2008-301034, however, a specific object displayed in a fisheye-distorted image needs to be specified by human eyes and an instruction needs to be given to a device for monitoring the object, and thus the object cannot be accurately and effectively recognized.

Since a distortion occurs in the fisheye-distorted image as described above, when an object recognizing technique for recognizing a specific object displayed in an image is applied, an object displayed on a fisheye-distorted image is difficult to accurately recognize.

The present invention has been made relevant to the above problems, and an object thereof is to provide a conference system, a monitoring system, an image processing apparatus, an image processing method and an image processing program capable of accurately and effectively recognizing an object based on a fisheye-distorted image photographed at a wide angle.

According to the present invention, when an arbitrary point on a 2D-viewable planar regular image, which is generated based on a distorted circular image photographed by a wide-angle lens or omnidirectional mirror, is instructed to select, pixel information on the distorted circular image corresponding to pixel information on the planar regular image indicated by the selection instruction is specified and a pixel information group configuring the planar regular image is newly generated based on a pixel information group configuring the distorted circular image around the specified pixel information, thereby accurately and effectively recognizing an object based on a fisheye-distorted image photographed at a wide angle.

DETAILED DESCRIPTION OF THE EMBODIMENT

An embodiment of the present invention will be described below in detail with reference to the appended drawings. The embodiment described later is such that the present invention is applied to an image processing apparatus.

[1. Principle of Conversion of Fisheye-Distorted Image]

A) Conversion into Planar Regular Image The image processing apparatus according to the present embodiment has, detailed later, a function of cutting out a part or all of a fisheye-distorted image as exemplary distorted circular image photographed by a wide-angle lens or omnidirectional mirror and converting it into a 2D-viewable planar regular image.

A basic principle of cutting out a part or all of a fisheye-distorted image and converting it into a planar regular image (which will be simply called "basic principle") will be first described with reference to FIGS. 1 and 2.

Figure 1:
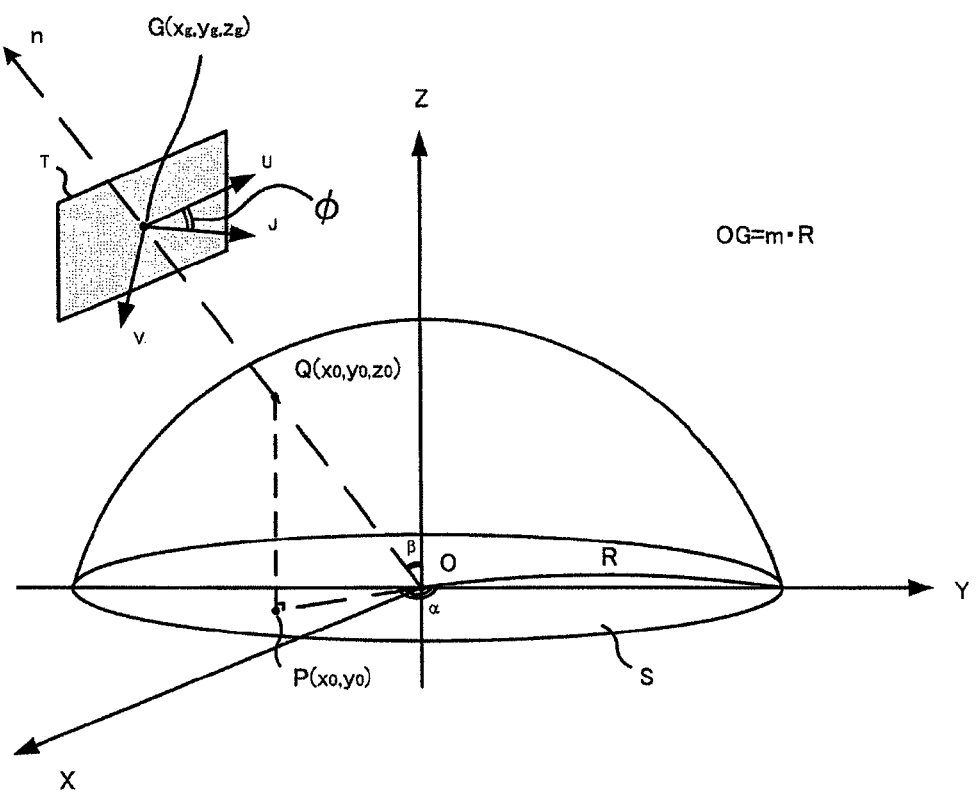
FIG. 1 is a conceptual diagram showing a concept of a basic principle.

FIG. 1 is a conceptual diagram showing a concept of the basic principle.

The basic principle is well known and thus a detailed explanation thereof will be omitted, but in order to obtain a pixel information group configuring a planar regular image, a corresponding coordinate at which each item of pixel information is positioned is calculated in a fisheye-distorted image corresponding to each item of pixel information configuring the planar regular image.

Specifically, a plane contacting at an arbitrary point on a virtual spherical surface obtained by modeling an optical property of a fisheye lens is defined as a planar regular image, each coordinate on the plane is converted into each coordinate in the fisheye-distorted image by a well-known coordinate conversion and thus the corresponding coordinate is calculated.

In order to cut out apart of the fisheye-distorted image S about the cut-out center point P(xo, yo) and convert it into the planar regular image T, there is applied a method for calculating a corresponding coordinate using a virtual spherical surface model defined in the XYZ coordinate system with O shown in FIG. 1 as the origin. In FIG. 2, a coordinate system in which the fisheye-distorted image S is present is assumed as the XY coordinate system and a coordinate system in which the planar regular image T is present is assumed as the UV coordinate system. The XY coordinate system or the UV coordinate system will indicate a coordinate system on the fisheye-distorted image S or the planar regular image T, respectively, in the following.

With the method for calculating a corresponding coordinate by the virtual spherical surface model, there is known that assuming that an intersection among P, a straight line parallel to the Z axis and a virtual spherical surface H is Q(xo, yo, zo), the origin G(Xg, Yg, Zg) of the planar regular image T as the corresponding coordinate corresponding to the cut-out center point P(xo, yo) defined on the fisheye-distorted image S is present on a vector n passing through Q and the origin in the XYZ coordinate system.

A radius of the fisheye-distorted image S is defined as R, an angle formed between a straight line connecting the cut-out center point P(xo, yo) and the origin OO of the XY coordinate system and the Y axis as azimuth angle α, an angle formed between a straight line connecting the origin G(Xg, Yg, Zg) as the origin of the UV coordinate system and the origin O of the XY coordinate system and the Z axis as zenith angle β, and an angle formed between the U axis and an axis passing through the J axis (G(xo, yo, zo)), parallel to the XY plane and perpendicular to the straight line OG (which is also called rotation reference axis) as planar tilt angle Φ, respectively. Assuming vector U in the U axis direction in the UV coordinate system and vector J in the rotation reference axis J, the planar tilt angle Φ is defined as an angle formed between the vector U and the vector J, and is typically called "planar tilt angle."

Thus, it can be seen that the position and the orientation of the planar regular image T in the UV coordinate system are decided by the three angles including the azimuth angle α, the zenith angle β and the planar tilt angle Φ. The three angles may be typically called Euler angle. A magnification m is defined as a parameter indicating a correction size of the planar regular image T. With a value of the magnification m, the UV coordinate system is arranged such that a distance between OG is m times as long as the radius R. The Euler angles and the magnification m are variables capable of changing depending on an orientation or size of the planar regular image to be converted. In other words, the Euler angles and the magnification m function as parameters, and are decided by user's input or device setting.

It is generally known that with the above relationship, point Si(xi, yi) on the XY coordinate system and point Ti(ui, vi) on the UV coordinate system are calculated (that is, the corresponding coordinates are calculated) by Expression (1) and (2) by using parameters A to F and w (Expression (3) to (9)).

x, y, u and v in Expression (1) and (2) correspond to xi, yi, ui and vi, respectively.

$$x = \frac{R(uA + vB + wC)}{\sqrt{u^2 + v^2 + w^2}} = G(uA + vB + wC) \quad \text{Expression (1)}$$

$$y = \frac{R(uD + vE + wF)}{\sqrt{u^2 + v^2 + w^2}} = G(uD + vE + wF) \quad \text{Expression (2)}$$

$$G = \frac{R}{\sqrt{u^2 + v^2 + w^2}}$$

$$A = \cos\phi\cos\alpha - \sin\phi\sin\alpha\cos\beta \quad \text{Expression (3)}$$

$$B = -\sin\phi\cos\alpha - \cos\phi\sin\alpha\cos\beta \quad \text{Expression (4)}$$

$$C = \sin\beta\sin\alpha \quad \text{Expression (5)}$$

$$D = \cos\phi\sin\alpha + \sin\phi\cos\alpha\cos\beta \quad \text{Expression (6)}$$

$$E = -\sin\phi\sin\alpha + \cos\phi\cos\alpha\cos\beta \quad \text{Expression (7)}$$

$$F = -\sin\beta\cos\alpha \quad \text{Expression (8)}$$

$$w = mR \quad \text{Expression (9)}$$

There will be described below with reference to FIG. 2 an exemplary conversion in which the corresponding coordinates are calculated and a part or entire fisheye-distorted image S is cut out and converted into the planar regular image T.

Figure 2:
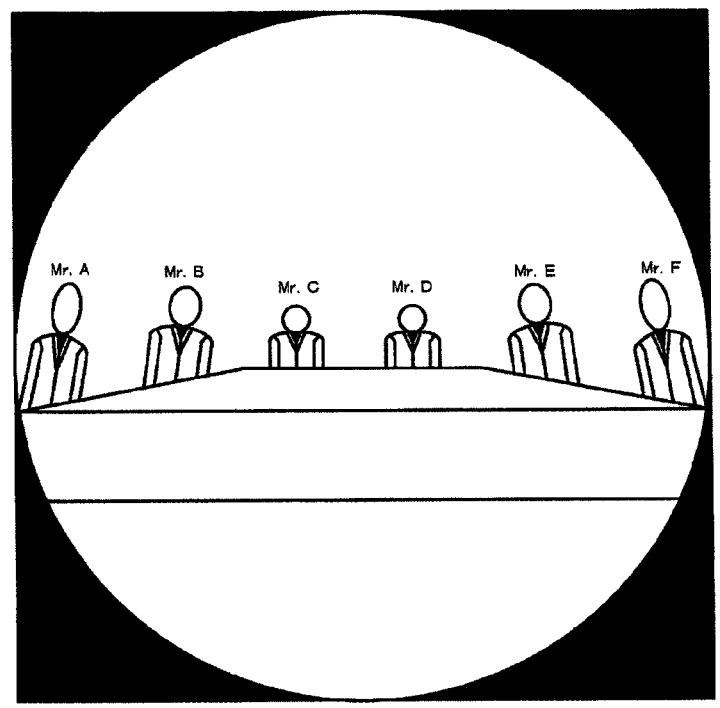
FIG. 2 is conceptual diagrams showing an exemplary conversion in which a part or all of a fisheye-distorted image S is cut out and converted into a planar regular image T.
Figure 2:
Figure 2:
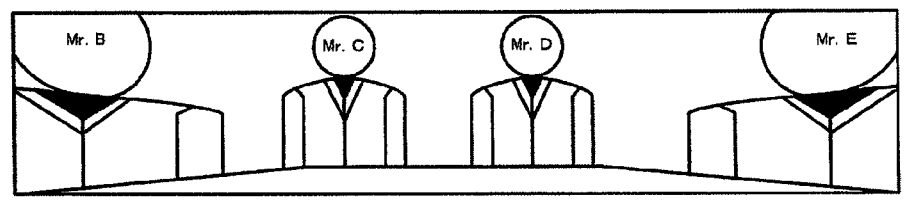

FIG. 2 is conceptual diagrams showing the exemplary conversion in which a part or entire fisheye-distorted image S is cut out and converted into the planar regular image T.

FIG. 2(A) shows the fisheye-distorted image S, and FIGS. 2(B) and 2(C) show images obtained by cutting out a part of the fisheye-distorted image S and converting it into the planar regular image T.

A size of the image converted from the fisheye-distorted image S into the planar regular image T (the total number of coordinates on the UV coordinate system) can be arbitrarily set. That is, an arbitrary range in the images configuring the fisheye-distorted image S can be converted into the planar regular image T.

FIG. 2(B) shows an example in which only Mr. D is selected from among the images displayed in the fisheye-distorted image S and is converted into the planar regular image T. FIG. 2(C) shows an example in which Mr. B to Mr. E are selected from among the images displayed in the fisheye-distorted image S and are converted into the planar regular image T.

B) Conversion into Curved Planar Regular Image

As described above, a distortion occurs in a fisheye-distorted image. It is known that the distortion is larger according to the distance from the center of the fisheye-distorted image (that is, toward the outer edge of the fisheye-distorted image).

With the example of FIG. 2, a smaller distortion occurs in FIG. 2(B) in which the image around the center of the fisheye-distorted image S is converted into the planar regular image T and thus a person is shown in a natural form. On the other hand, in FIG. 2(C) in which the images from the center of the fisheye-distorted image S to the outer edge are converted into the planar regular image T, a large distortion is present in the planar regular image T (that is, Mr. B and Mr. E) corresponding to the images displayed at the outer edge of the fisheye-distorted image S and the persons are shown to be enlarged in the horizontal direction relative to the screen. In other words, the persons are shown in an unnatural form.

When an object recognizing technique for recognizing a specific object displayed on an image is applied to the planar regular image having a large distortion, the objects displayed on the fisheye-distorted image are difficult to accurately recognize.

In order to specifically explain the images shown in FIGS. 2(B) and 2(C), there will be assumed a case in which a pattern matching method generally known as the object recognizing technique (a technique for recognizing an object by comparing a previously-stored image with an image displayed on a screen in similarity) is applied.

The person image shown in FIG. 2(B) can be generally grasped as person, and is likely to be similar to a previously-stored person image. Thus, a specific object displayed on an image can be recognized by applying the object recognizing technique.

On the other hand, the person images shown in FIG. 2(C) are generally difficult to grasp as persons, and is less likely to be similar to the previously-stored person image. Thus, a specific object displayed on an image is difficult to recognize by applying the object recognizing technique.

For the above basic principle, a small distortion occurs in the planar regular image as distortion-corrected image in a narrow range (for example, when the image around the center of the fisheye-distorted image S is converted into the planar regular image) and thus the basic principle can be used with the object recognizing technique, while a larger distortion occurs in the planar regular image as distortion-corrected image in a wide range (for example, when the image from the center of the fisheye-distorted image S to the outer edge is converted into the planar regular image) with distance from the center of the UV coordinate system and thus the basic principle is difficult to use with the object recognizing technique.

In order to improve distortions occurring near the right and left contours on the planar regular image T, the present inventors have invented a technique for finding the planar regular image T by deciding pixel information at a coordinate C(u, v) in converted pixel information based on pixel information near a coordinate P(x, y) obtained by using a correspondence equation indicating a correspondence between a coordinate C'(u', v) on the UV curved coordinate system and the coordinate P(x, y) on the XY coordinate system and displaying the image on a displaying part on the plane based on converted pixel arrangement data (for details, see Japanese Patent Application Laid-Open No. 2010-62790 Publication, for example).

The converting method disclosed in Japanese Patent Application Laid-Open No. 2010-62790 Publication will be simply referred to as "conversion into a curved planar regular image" below.

The conversion into a curved planar regular image is a well-known technique and thus a detailed explanation thereof will be omitted, but an outline thereof will be described with reference to FIGS. 3 and 4. The same reference numerals as those previously described in FIGS. 3 and 4 denote at least the same functions (including operations and effects) and thus a detailed explanation thereof will be omitted.

Figure 3:
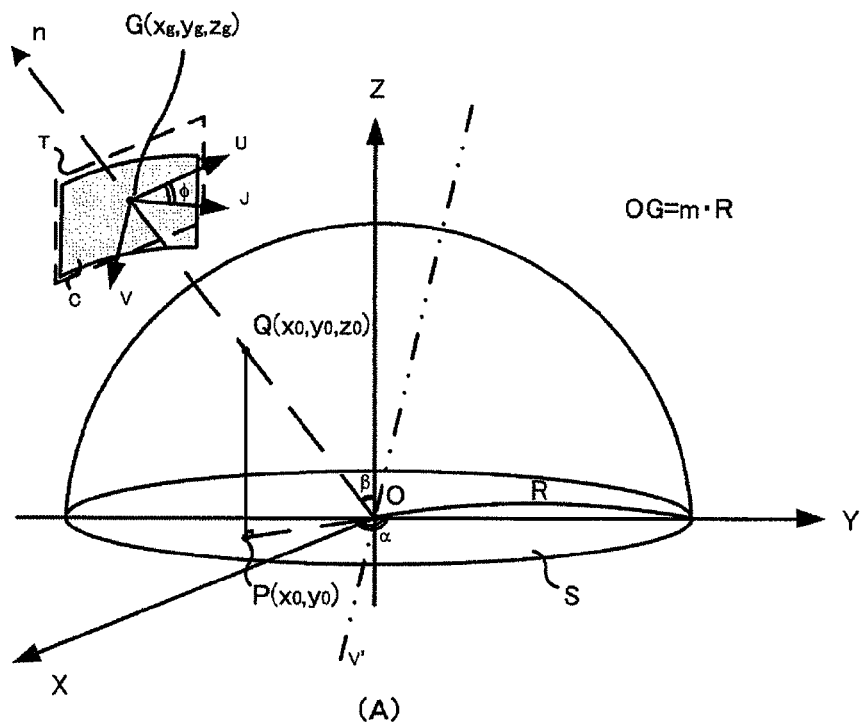
FIG. 3 is conceptual diagrams showing a conversion into a curved planar regular image.
Figure 3:
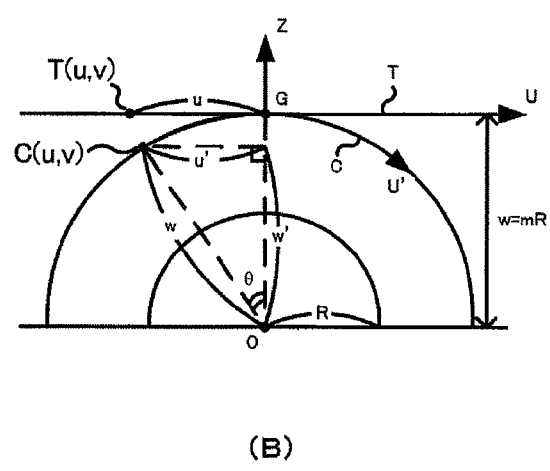

FIG. 3 is conceptual diagrams showing a conversion into a curved planar regular image.

The conversion into a curved planar regular image defines a virtual spherical surface H having a radius R on the fisheye-distorted image S on the XY plane, Euler angles and a magnification m as shown in FIGS. 3(A) and 3(B) (similar to FIG. 2). Similar to FIG. 2, an eye vector n passing through point Q immediately on point P is found, and the UV coordinate system having an orientation depending on the angle Φ is defined on the plane T perpendicular to the eye vector n at point G where the OG distance is m·R. The UV coordinate system is curved along the side face C of "a virtual column whose point G is one point on the side face and whose center axis is a straight line V' parallel to the V axis and passing through point O", thereby defining the UV curved coordinate system.

With the definition, the UV coordinate system T, and the UV curved coordinate C obtained by curving the UV coordinate system T are in a positional relationship shown in FIG. 3(B).

In other words, the UV plane as the coordinate plane of the UV coordinate system is parallel to the XY plane and an interval therebetween is set at w=mR. As illustrated, the U axis is defined in the horizontal direction along the UV plane, and the V axis is defined in the vertical direction relative to the sheet at point G. The planar regular image T is defined on the UV plane.

On the other hand, the UV curve as the coordinate plane of the UV curved coordinate system is obtained by curving the UV plane along the side face of the virtual column. The virtual column is a column whose center axis is the V' axis (parallel to the V axis and passing through the origin O) and which has a radius w=mR, and contacts the UV plane at the axis V. The UV curve coincides with the side face of the virtual column, where the U axis is defined along the arc of the circle having the radius w=mR and the V axis is defined in the vertical direction relative to the sheet at point G. The curved regular image C is defined on the UV curve.

In this way, the UV coordinate system and the UV curved coordinate system have the common V axis as one coordinate axis and are different from each other in a spatial position of the U axis as the other coordinate axis. A scale span of the coordinate scale is the same in both coordinate systems, and an arbitrary point position on the coordinate plane is indicated with the coordinate (u, v) in both coordinate systems. A relationship between two points indicated with the same coordinate (u, v) on both coordinate systems can be assumed as follows.

In other words, as shown at the upper left of FIG. 3(B), in terms of point T(u, v) on the UV coordinate system, it can be seen that the point T(u, v) is on the planar regular image T, is spaced by the coordinate value u along the U axis from the origin G and is spaced by the coordinate value v in the V axis direction.

Then, in terms of point C (u, v) on the UV curved coordinate system, the point C(u, v) is on the curved regular image C, is spaced by the coordinate value u along the arc A from the origin G, and is spaced by the coordinate value v in the V axis direction.

As described above, since both the point T(u, v) and the point C(u, v) are expressed with the coordinate (u, v) but are defined in different coordinate systems, both points are different in spatial position indicated in the XYZ 3D Cartesian coordinate system. In other words, assuming the coordinate value of the XYZ 3D Cartesian coordinate system, the coordinate of the point T(u, v) corresponds to T(u, v, w) while the coordinate of the point C(u, v) corresponds to C(u', v, w'). It can be seen from FIG. 3(B) that u'=w·sin θ and w'=w·cos θ are obtained.

Since the length of the arc GC is equal to the absolute value of the coordinate value u and the radius of the arc A is w, the angle θ shown in FIG. 3(B) is θ=u/w radians. Thus, it can be seen that u' and w' are expressed as u'=w·sin(u/w) and w'=w·cos(u/w), respectively. Since both the UV coordinate systems have the V axis as the common coordinate axis, the Y coordinate values of the points T and C take the same coordinate value v.

With the above relationship, point Si(xi, yi) on the XY coordinate system and point C'(u', v) on the UV curved coordinate system can be found by the computing Expression (10) and (13) by using parameters A to F and w' (Expression (3) to (9)). The image near point P is obtained on the UV curved coordinate system and is developed on the plane T to obtain the planar regular image T.

With the structure, the present inventors have demonstrated that distortions are largely improved near the right-side contour or near the left-side contour of the planar regular image T.

Expression (10) to (13) will be described below. x, y in Expression (10) to (13) correspond to xi, yi described above, respectively.

$$u' = w \cdot \sin\frac{u}{w} \quad \text{Expression (10)}$$

$$w' = w \cdot \cos\frac{u}{w} \quad \text{Expression (11)}$$

$$x = \frac{R(u'A + vB + w'C)}{\sqrt{u'^2 + v^2 + w'^2}} = G(u'A + vB + w'C) \quad \text{Expression (12)}$$

$$y = \frac{R(u'D + vE + w'F)}{\sqrt{u'^2 + v^2 + w'^2}} = G(u'D + vE + w'F) \quad \text{Expression (13)}$$

$$G = \frac{R}{\sqrt{u'^2 + v^2 + w'^2}}$$

There will be described below with reference to FIG. 4 an exemplary conversion in which a part or entire fisheye-distorted image S is cut out and converted into the planar regular image T by using the above curved coordinate system.

Figure 4:
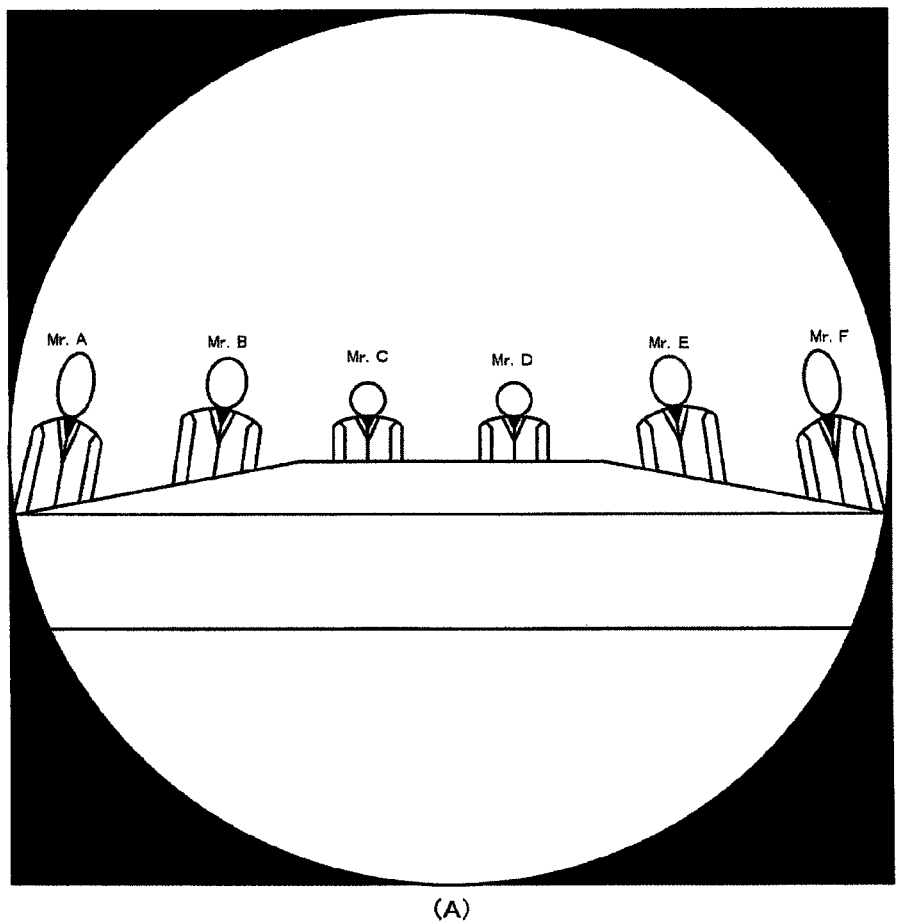
FIG. 4 is conceptual diagrams showing an exemplary conversion in which a part or entire fisheye-distorted image S is cut out and converted into the planar regular image T by using the curved coordinate system.
Figure 4:
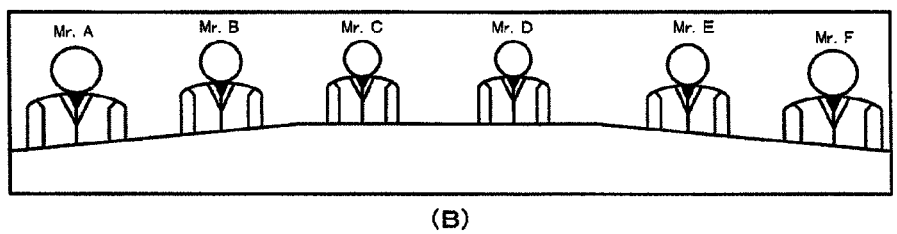

FIG. 4 is conceptual diagrams showing the exemplary conversion in which a part or all of the fisheye-distorted image S is cut out and converted into the planar regular image T by using the above curved coordinate system.

FIG. 4(A) shows the fisheye-distorted image S and FIG. 4(B) shows an image which is obtained by cutting out a part of the image S and converting it into the planar regular image by using the curved coordinate system. As described above, the size of the image when being converted from the fisheye-distorted image S into the planar regular image can be arbitrarily set.

FIG. 4(B) shows an example in which Mr. B to Mr. E are selected from among the images in the fisheye-distorted image S and are converted into the planar regular image. The selected range is the same as the example of FIG. 2(C), but it can be seen that little distortion occurs near the right and left contours on the planar regular image shown in FIG. 4(B) as compared with the planar regular image shown in FIG. 2(C).

Any converting methods including the "basic principle" and the "conversion into a curved planar regular image" can be applied in the image processing apparatus according to the present embodiment, but an example using the "conversion into a curved planar regular image" will be described below.

The fisheye-distorted image S is photographed by a camera (such as fisheye lens camera) comprising a wide-angle lens or omnidirectional mirror, and a relationship between a direction in which the fisheye lens camera is arranged and a correction direction will be described with reference to FIG. 5.

Figure 5:
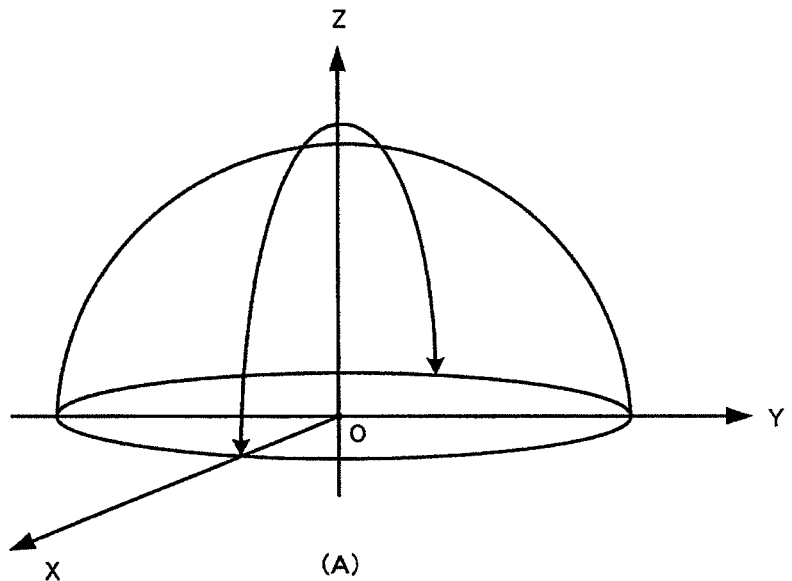
FIG. 5 is conceptual diagrams showing a relationship between a direction in which a fisheye lens camera is arranged and a correction direction.
Figure 5:
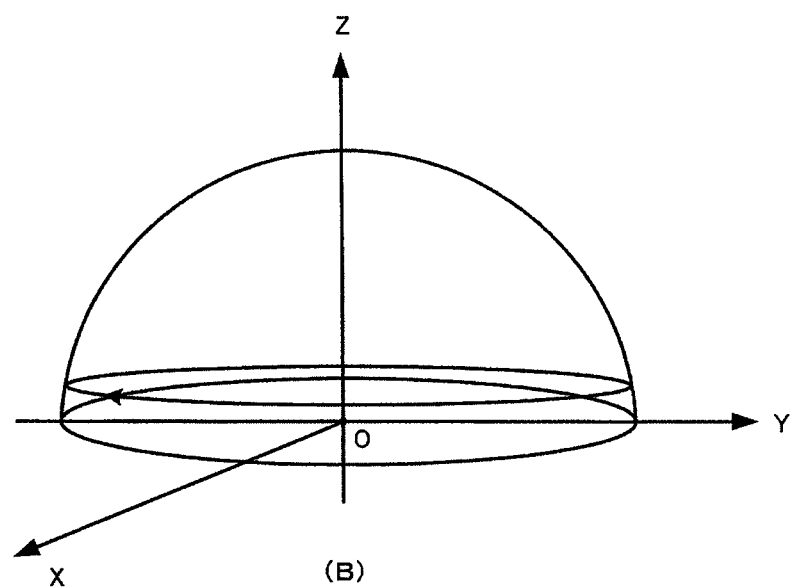

FIG. 5 is conceptual diagrams showing the relationship between the directions in which the fisheye lens camera is arranged and the correction direction.

FIG. 5(A) shows an example of the correction direction when the fisheye lens camera is arranged sideways (for example, opposite to the Z axis). A distortion correction may be made in the arrow direction in FIG. 5(A) in order to obtain a planar regular image having a wide angle of about 180 degrees.

FIG. 5(B) shows an example of the correction direction when the fisheye lens camera is faced upward (for example, in parallel to the Z axis). A distortion correction may be made in the arrow direction in FIG. 5(B) in order to obtain a planar regular image having a wide angle of about 360 degrees.

In other words, when the fisheye lens camera is faced sideways, a correction is made in the arrow direction as shown in FIG. 5(A), thereby generating a panoramic planar regular image with about 180 degrees. When the fisheye lens camera is faced upward, a correction is made in the arrow direction of FIG. 5(B), thereby generating a panoramic planar regular image with about 360 degrees.

[2. Structure and Functional Outline of Image Processing Apparatus]

The image processing apparatus according to the present embodiment has a function of performing a processing of cutting out a part or all of a fisheye-distorted image as exemplary distorted circular image photographed by the wide-angle lens or omnidirectional mirror and converting it into a 2D-viewable planar regular image (which will be simply called "conversion" below) and a processing of reconverting the photographed fisheye-distorted image into a planar regular image about an arbitrary point on the planar regular image (which will be simply called "reconversion" below).

The structure and functional outline of the image processing apparatus having the function according to the present embodiment will be described with reference to FIG. 6 and others.

Figure 6:
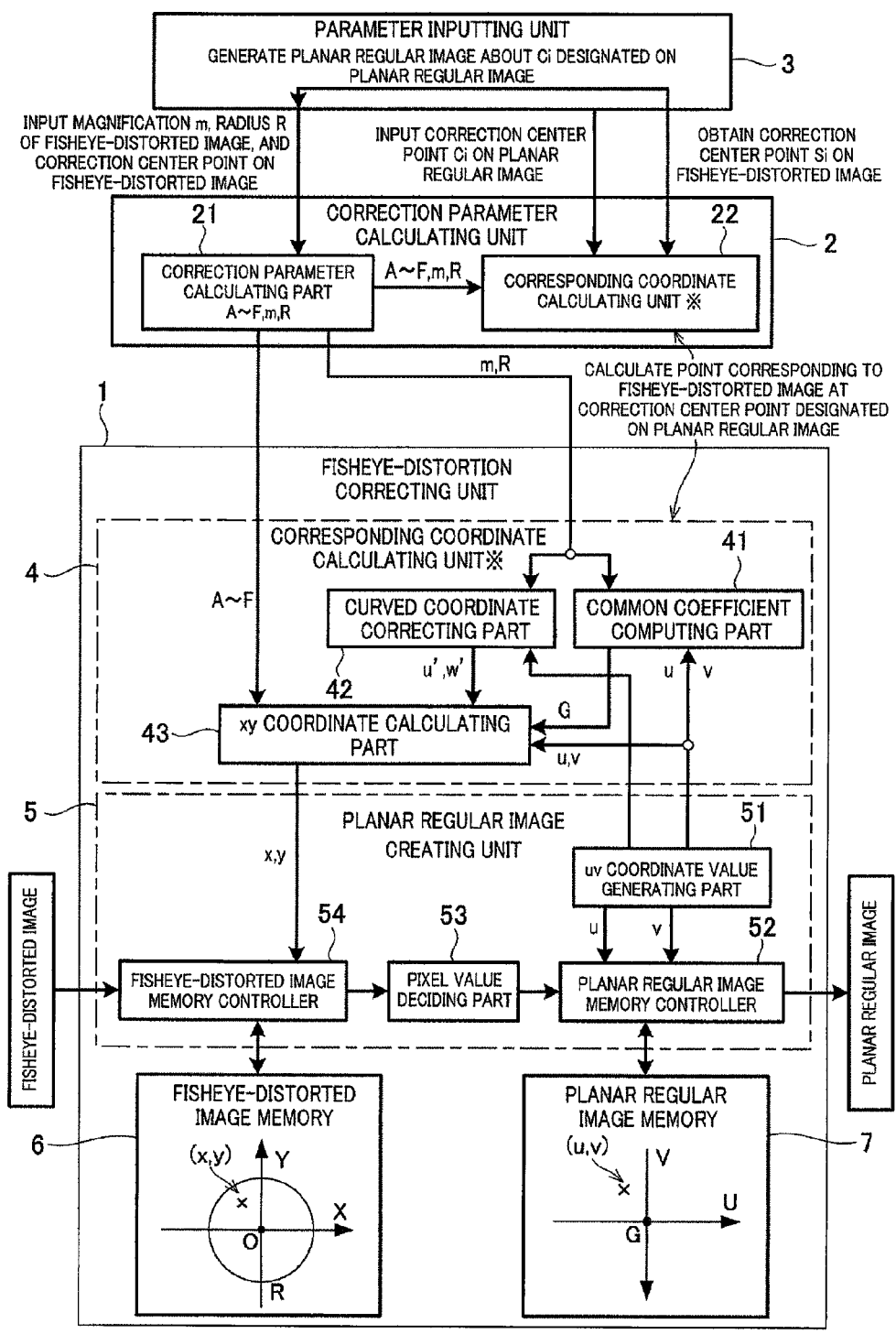
FIG. 6 is a block diagram showing a structure and functional outline of an image processing apparatus according to an embodiment.

FIG. 6 is a block diagram showing the structure and functional outline of the image processing apparatus according to the present embodiment.

As shown in FIG. 6, the image processing apparatus SS includes a fisheye-distortion correcting unit 1 (an exemplary conversion unit), a correction parameter calculating unit 2, a parameter inputting unit 3 and others.

The fisheye-distortion correcting unit 1 includes a corresponding coordinate calculating unit 4, a planar regular image creating unit 5, a fisheye-distorted image memory 6 (an exemplary distorted circular image storing unit), a planar regular image memory 7 (an exemplary planar regular image storing unit) and others for executing a function of performing a processing of calculating a corresponding coordinate at which each item of pixel information is positioned on the fisheye-distorted image corresponding to each item of pixel information configuring the planar regular image.

Specifically, when surrounding subjects are photographed at 180 degrees by an optical lens (not shown) and the fisheye-distorted image S as an exemplary distorted circular image having the radius S is converted into digital data by an image sensor (not shorn) in the fisheye-distortion correcting unit 1, the converted fisheye-distorted image S is stored in the fisheye-distorted image memory 6. The fisheye-distortion correcting unit 1 converts the converted image into the planar regular image T as a pixel information group capable of being displayed on a display device (not shown) and stores the planar regular image T in the planar regular image memory 7.

The fisheye-distorted image memory 6 is configured of a typical buffer memory for image data storage, and stores the fisheye-distorted image S as a pixel information group configured of a set of many pixels arranged at the coordinates (x, y) on the XY coordinate system. The fisheye-distorted image S is an image having the radius S about the origin O in the XY coordinate system as described above.

The planar regular image memory 7 is configured of a typical buffer memory for image data storage, and stores the planar regular image T as a pixel information group configured of a set of many pixels arranged at the coordinates (u, v) on the UV coordinate system. The contour of the planar regular image T can be arbitrarily set. The pixel information stored in the planar regular image memory 7 is used for both the planar regular image T and the curved regular image C described above.

As stated in [1. Principle of conversion of fisheye-distorted image], the UV coordinate system and the UV curved coordinate system are common in that both are a 2D coordinate system having the U axis and the V axis, and the planar regular image T defined on the UV coordinate system and the curved regular image C defined on the UV curved coordinate system are common in that both are configured of an arrangement of many pixels arranged at the coordinate values (u, v). Thus, the planar regular image T can be obtained by displaying an image on a plane based on the pixel arrangement data stored in the planar regular image memory 7 while the curved regular image C can be obtained by displaying an image on a column side face. The pixel arrangement data stored in the planar regular image memory 7 can be data for the planar regular image T and data for the curved regular image C.

The corresponding coordinate calculating unit 4 uses the parameters (the values of A to F, $\alpha$, $\beta$, $\Phi$ in Expression (3) to (8)) set by the correction parameter calculating unit 2 detailed later and the preset radius R to calculate the corresponding coordinate (x, y) on the fisheye-distorted image S corresponding to an arbitrary coordinate (u, v) on the planar regular image given by the planar regular image creating unit 5 detailed later.

In other words, the corresponding coordinate calculating unit 4 has a function of, when an arbitrary coordinate (u, v) on the planar regular image is given, returning the corresponding coordinate (x, y) on the fisheye-distorted image S corresponding to the arbitrary coordinate to the planar regular image creating unit 5. The arbitrary coordinate (u, v) on the planar regular image is generated by the pixels of the output planar regular image by an uv coordinate value generating unit 51 described later.

More specifically, the corresponding coordinate calculating unit 4 has a function of calculating the corresponding coordinate (x, y) corresponding to the coordinate (u, v) by the computations based on the relational Expression (equation (1) to equation (9)) in the basic principle or the relational Expression (equation (10) to equation (13)) in the conversion into a curved planar regular image, and includes a common coefficient computing part 41, a curved coordinate correcting part 42, and an xy coordinate calculating part 43.

When being given the magnification m from a parameter inputting unit 100 and the coordinate v from a planar regular image creating unit 300, the common coefficient calculating part 41 uses the preset radius R of the distorted circular image to perform a processing of substituting the value calculated in equation (9) into G and computing the common coefficient G.

The curved coordinate correcting part 42 has a function of making a calculation necessary for correcting the coordinate (u, v) on the 2D UV Cartesian coordinate system defined on a plane into the coordinate (u, v) on the 2D UV curved coordinate system defined on a column side face, and calculates u' and w' based on Expression (9), (10) and (11) by using the preset radius R of the fisheye-distorted image when being given the magnification m from the parameter inputting unit 100 and the coordinate u from the planar regular image creating unit 300.

When the relational Expression (Expression (1) to (9)) in the basic principle are used, the curved coordinate correcting part 42 is omitted and u, v, ware input into the xy coordinate calculating part 43 instead of u', v, w'.

The xy coordinate calculating part 43 uses the coordinate v given from the planar regular image creating unit 5, A to F (Expression (3) to (8)) input from the correction parameter calculating unit 2, the common coefficient G calculated by the common coefficient computing part 41, u' and w' calculated by the curved coordinate correcting part 42, and the preset radius R of the fisheye-distorted image to calculate and output x and y based on Expression (12) and (13) to the planar regular image creating unit 5.

The planar regular image creating unit 5 uses the values output from the xy coordinate calculating part 43 to create and store the planar regular image into the planar regular image memory 7. More specifically, first, the coordinate (u, v) of the first pixel of interest configuring the planar regular image is given to the corresponding coordinate calculating unit 4 to calculate the corresponding coordinate (x, y). A processing of reading a pixel value of a pixel arranged near the corresponding coordinate (x, y) of the fisheye-distorted image S stored in the fisheye-distorted image memory 6 and deciding a pixel value of a pixel of interest based on the read pixel value is performed per pixel configuring the planar regular image, and the pixel value of each pixel is stored in the planar regular image memory 7 to create the planar regular image.

In order to realize the functions, the planar regular image creating unit 5 includes the uv coordinate value generating part 51, a planar regular image memory controller 52 (an exemplary screen information generation unit), a pixel value deciding part 53, and a fisheye-distorted image memory controller 54.

The uv coordinate value generating part 51 generates a value of uv (coordinate value) for the pixels configuring the output planar regular image. For example, when the size of the output planar regular image is 400 dots horizontal×300 dots vertical, the values of u=−200 to 200 and v=−150 to 150 are output.

The planar regular image memory controller 52 is a control device for writing and reading data into and from the planar regular image memory 7, and when a pixel value of a specific pixel is decided by the pixel value deciding part 53, performs a processing of writing the decided pixel value in the specific pixel stored in the planar regular image memory 7. In this way, when the processing of writing the pixel value is completed for all the pixels, the planar regular image T is created in the planar regular image memory 7. The planar regular image memory controller 52 reads and outputs data on the planar regular image T to a displaying part (not shown), and displays the planar regular image T on a display screen.

The fisheye-distorted image memory controller 54 is a control device for writing and reading data into and from the fisheye-distorted image memory 6. As described above, the data on the input fisheye-distorted image S is stored in the fisheye-distorted image memory 6 by the fisheye-distorted image memory controller 54.

The fisheye-distorted image memory controller 54 can read and output the data on the fisheye-distorted image S stored in the fisheye-distorted image memory 6 to the display device, and can display the fisheye-distorted image S on the display screen as needed.

Further, when being given a coordinate (x, y) from the corresponding coordinate calculating unit 4, the fisheye-distorted image memory controller 54 also serves to read a pixel value of a pixel positioned near the coordinate (x, y) from the data on the fisheye-distorted image S stored in the fisheye-distorted image memory 6 and to give the pixel value to the pixel value deciding part 53.

There will be described a processing of converting the fisheye-distorted image S into the planar regular image T by the thus-configured planar regular image creating unit 5.

First, the uv coordinate value generating part 51 generates a coordinate (u, v) indicating a specific pixel of interest on the pixel arrangement configuring the planar regular image T. The generated coordinate (u, v) is given from the uv coordinate value generating part 51 to the corresponding coordinate calculating unit 4. Thereby, a corresponding coordinate (x, y) corresponding to the coordinate (u, v) is calculated and the corresponding coordinate (x, y) is given to the fisheye-distorted image memory controller 54.

As stated above, the fisheye-distorted image memory controller 54 reads the pixel value of the pixel positioned near the coordinate (x, y) from the data on the fisheye-distorted image S stored in the fisheye-distorted image memory 6 and gives it to the pixel value deciding part 53.

The fisheye-distorted image S is configured of a set of many pixels arranged at the coordinates (x, y) on the 2D XY Cartesian coordinate system, and is actually configured of the digital data defining the unique pixel values at many lattice points arranged in a matrix at predetermined pitch. Therefore, the corresponding coordinates (x, y) calculated by the corresponding coordinate calculating unit 4 are typically positioned between multiple lattice points.

Thus, when actually deciding the pixel value of the pixel of interest on the planar regular image T arranged at the position of the coordinate (u, v), the pixel value deciding part 53 reads the pixel values of the reference pixels on the fisheye-distorted image S arranged near the position of the corresponding coordinate (x, y), and makes an interpolating calculation (such as well-known bilinear interpolating method, bicubic/spline interpolating method) on the pixel values of the reference pixels. A pixel value of a pixel nearest to the position indicated by the corresponding coordinate (x, y) may be decided as the pixel value of the pixel of interest without performing the interpolation.

The pixel value of the pixel of interest decided by the pixel value deciding part 53 in this way is input into the planar regular image memory controller 52. On the other hand, the generated coordinate (u, v) is input from the uv coordinate value generating part 51 into the planar regular image memory controller 52.

The planar regular image memory controller 52 performs a processing of writing the pixel value decided by the pixel value deciding part 53 as the pixel value of the pixel of interest positioned at the coordinate (u; v) of the planar regular image T stored in the planar regular image memory 7.

Though a pixel value of a pixel of interest is decided and written as described above, the uv coordinate value generating part 51 sequentially generates the coordinates (u, v) indicating all the pixels on the pixel arrangement configuring the planar regular image T and the pixel values of the individual pixels are decided and stored in the planar regular image memory 7.

The parameter inputting unit 3 includes a keyboard, a mouse, a trackball, a touch panel or an electronic pen, and can designate one point on the fisheye-distorted image S displayed on the display device or the planar regular image T subjected to the conversion processing in response to a user's operation.

More specifically, the three parameters including the eye vector n, the planar tilt angle $\Phi$ and the magnification m are needed for calculating the corresponding coordinate by using Expression (1) and (2) or (12), (13) or the like. The parameter inputting unit 3 is a component for inputting the three parameters based on a user's instruction. In other words, the parameter inputting unit 3 serves to input the eye vector n facing in an arbitrary direction with the origin O as starting point on the 3D XYZ Cartesian coordinate system as the parameter indicating where the planar regular image is cut out, to input the predetermined planar tilt angle $\Phi$ as the parameter indicating an orientation in which the planar regular image is cut out, and to input the predetermined magnification m as the parameter indicating the correction size of the planar regular image.

In the present embodiment shown herein, the display device can display the fisheye-distorted image S stored in the fisheye-distorted image memory 6 as needed. The parameter inputting unit 3 receives the user's input instruction of designating one point on the fisheye-distorted image S displayed on the display device thereby to grasp the position of the point as cut-out center point P(x0, y0), and receives the cutout center point as the parameter indicating the eye vector n thereby to output it to the correction parameter calculating unit 2.

The correction parameter calculating unit 2 includes a correction parameter calculating part 21 (an exemplary selection-instruction receiving unit) and a corresponding coordinate calculating unit 22 (an exemplary corresponding coordinate specifying unit).

When being given the eye vector n and the planar tilt angle $\Phi$ from the parameter inputting unit 3, the correction parameter calculating part 21 finds the azimuth angle $\alpha$ and the zenith angle $\beta$ based on the eye vector n, and calculates the rotation coefficients A, B, C, D, E, F based on Expression (3) to (8).

As described above, the image processing apparatus according to the present embodiment has a function of reconverting the fisheye-distorted image S stored in the fisheye-distorted image memory 6 into the planar regular image T about an arbitrary point on the planar regular image T converted from the fisheye-distorted image S.

The correction parameter calculating part 21, the corresponding coordinate calculating unit 22 and the fisheye-distortion correcting unit 1 (an exemplary reconverting unit) are provided for realizing the reconversion.

In many cases, for displaying the planar regular image T obtained by the above conversion on the display device, the planar regular image T has to be reduced in size to a displayable area of the display device for display. Thus, the displayed planar regular image T is displayed by interpolating a part of the pixel information for reducing the original image in its size.

When the planar regular image T from which a part of the pixel information is interpolated is cut out and displayed in a predetermined range or is displayed in an enlarged manner (that is, when a detailed image of the planar regular image T is displayed), a block distortion (block noise) occurs, which remarkably deteriorates a discrimination between subjects on an image.

The block distortion is also called block noise, and is a phenomenon that partial areas in an image seem mosaic-like in a video.

An example in which a block noise occurs in the detailed image of the planar regular image T will be described herein with reference to FIG. 7.

Figure 7:
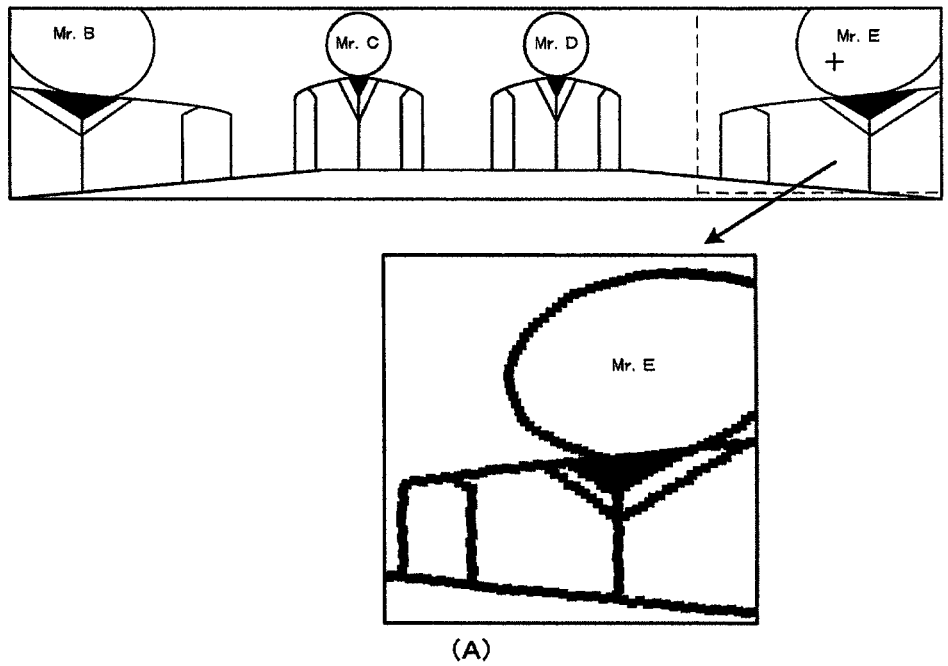
FIG. 7 is conceptual diagrams showing an example in which a block noise occurs in a detailed image of the planar regular image T.
Figure 7:
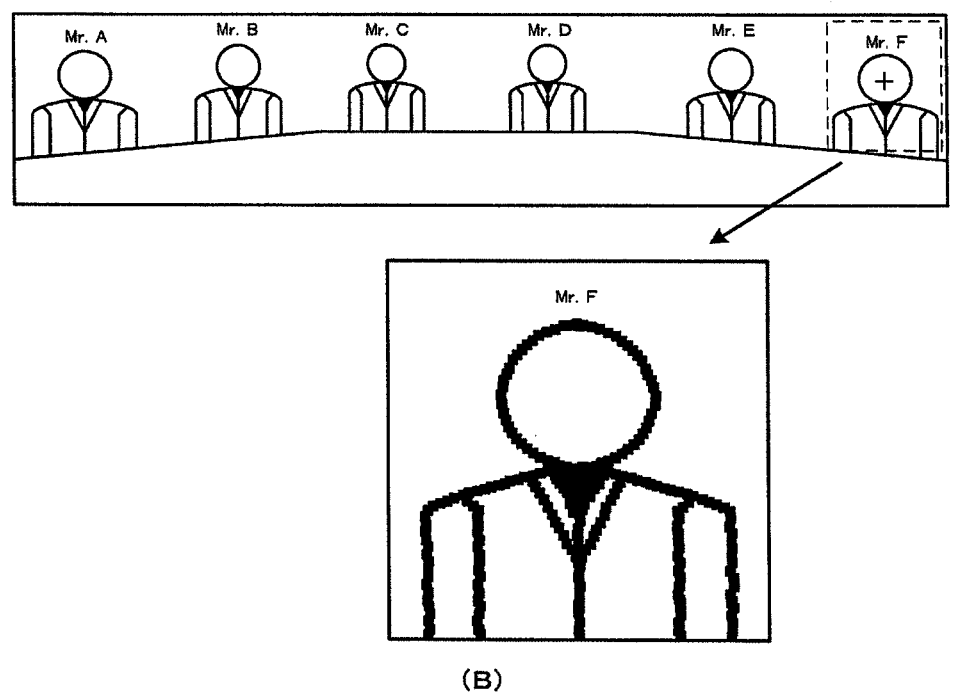

FIG. 7 is conceptual diagrams showing an example in which a block noise occurs in the detailed image of the planar regular image T. The cross marks in the upper diagrams of FIGS. 7(A) and 7(B) indicate an area to which an instruction is given by the parameter inputting unit 3 for cutting out and displaying a predetermined range (such as an instruction by the pointing device).

The upper diagram of FIG. 7(A) shows the example in which the fisheye-distorted image S is converted into the planar regular image T by the basic principle and the lower diagram of FIG. 7(A) shows the example in which a part of the converted planar regular image T is cut out and displayed.

From the example of the lower diagram of FIG. 7(A), it can be seen that a block noise occurs in the subject in the cut-out and displayed planar regular image T and the contour of the subject is largely distorted.

The upper diagram of FIG. 7(B) shows the example in which the fisheye-distorted image S is converted into the planar regular image T by the conversion into a curved planar regular image, and the lower diagram of FIG. 7(B) shows the example in which a part of the converted planar regular image T is cut out and displayed.

From the example of the lower diagram of FIG. 7(B), it can be seen that a block noise occurs in the cut-out and displayed planar regular image T and the contour of the subject is largely distorted.

The fisheye-distorted image S is converted into the planar regular image T in order to convert a photographed object into the planar regular image T capable of being easily monitored and to present it to the user since a significant distortion occurs in the fisheye-distorted image S. In order to keep monitoring it or to obtain more detailed information on the object photographed in the planar regular image T, it is desirable that a predetermined range of the object photographed in the planar regular image T is cut out and displayed or is displayed in an enlarged manner. It is desirable that the object recognizing technique is applied to the planar regular image T to accurately recognize the object on the fisheye-distorted image without human operation.

However, it is difficult for the user to obtain detailed information on the image in which the block noise occurs and to apply the object recognizing technique.

The image processing apparatus SS according to the present embodiment is configured to perform the reconversion by using the correction parameter calculating part 21, the corresponding coordinate calculating unit 22 and the fisheye-distortion correcting unit 1.

The reconversion will be described in detail with reference to FIGS. 8 to 10.

Figure 8:
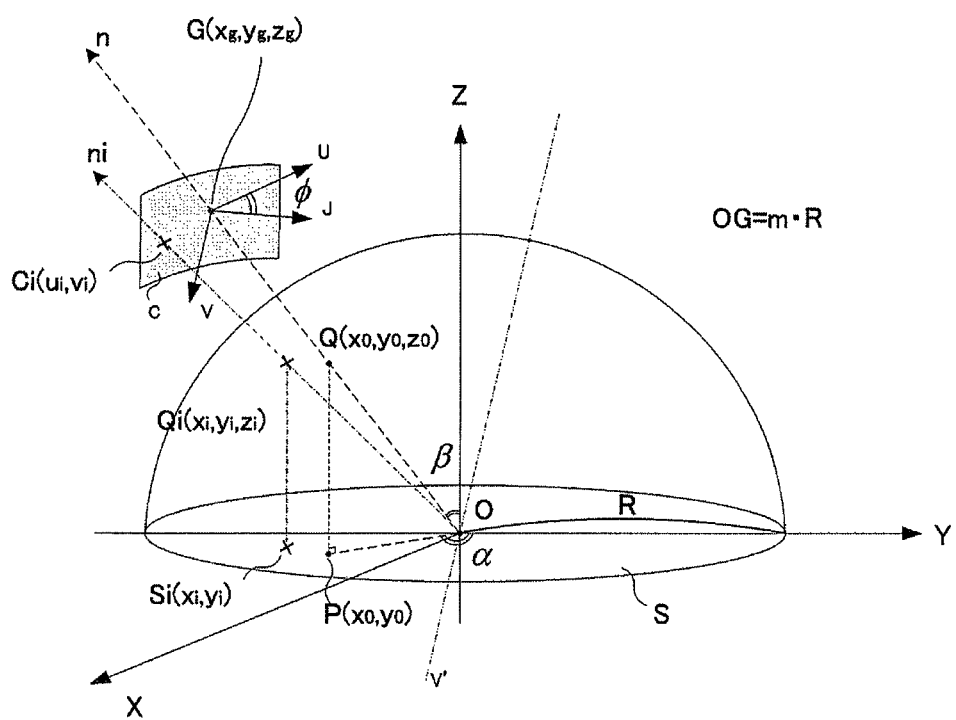
FIG. 8 is a conceptual diagram for explaining a detailed reconversion.
Figure 9:
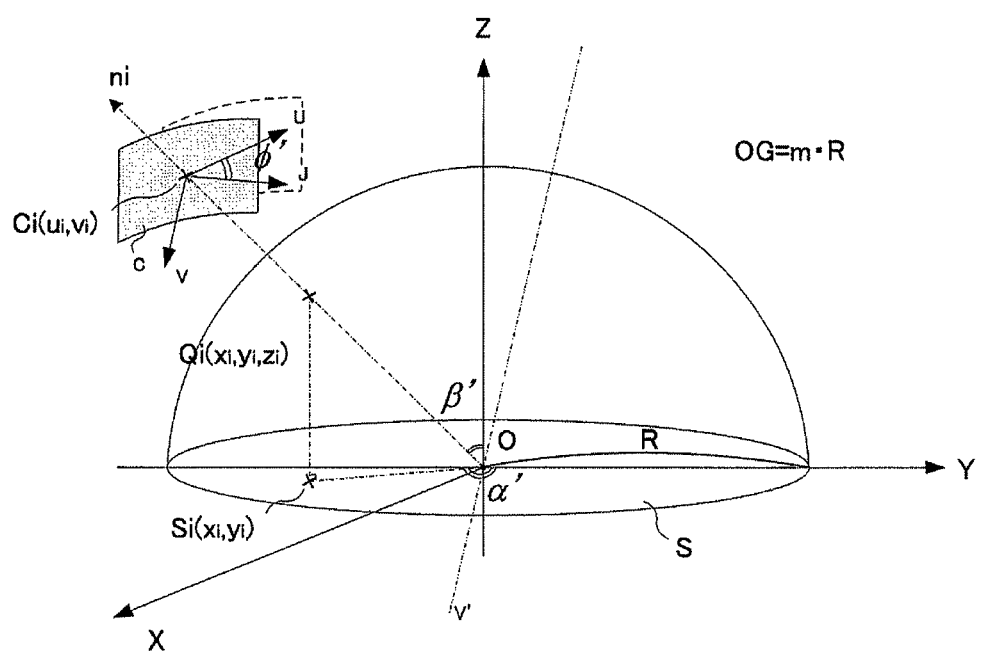
FIG. 9 is a conceptual diagram for explaining the detailed reconversion.
Figure 10:
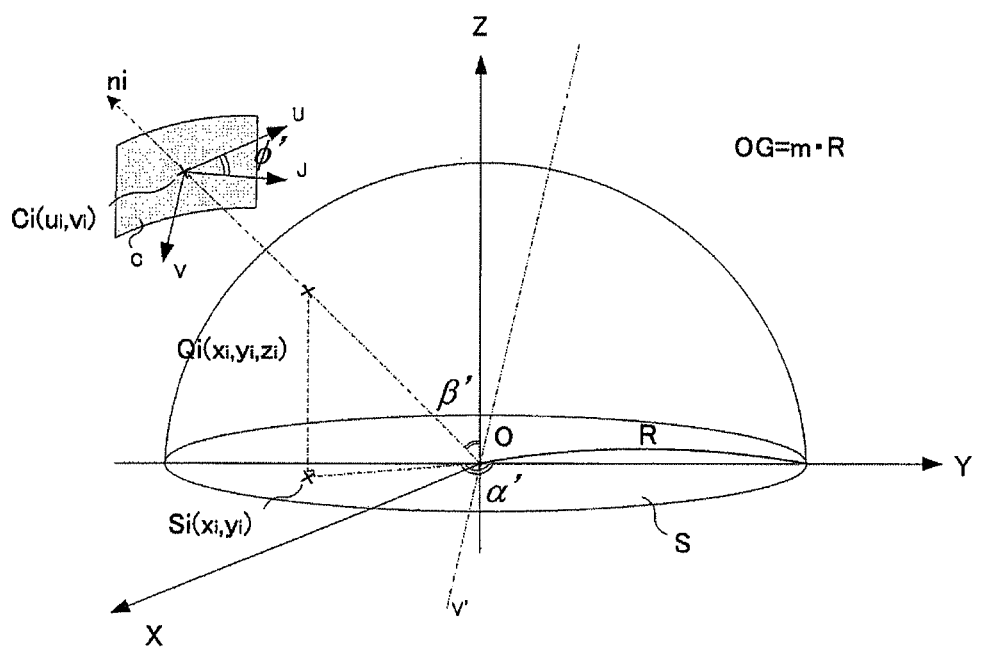
FIG. 10 is a conceptual diagram for explaining the detailed reconversion.

FIGS. 8 to 10 are conceptual diagrams for explaining the detailed reconversion.

The reconversion may employ both the converting method with the basic principle and the converting method with the conversion into a curved planar regular image, and the converting method with the conversion into a curved planar regular image will be described below.

There will be assumed a case in which a fisheye-distorted image S is subjected to the conversion processing, that is, converted into a curved planar regular image C by the above processing and the curved planar regular image is displayed on the displaying part. It is assumed herein that the curved planar regular image C about the cut-out center P(xo, yo) is displayed as shown in FIG. 8. The cut-out center P(xo, yo) may be designated based on the user's operation of the parameter inputting unit 3 or may be designated based on the position preset by the image processing apparatus SS.

The user can select an arbitrary point on the curved planar regular image C based on the operation of the parameter inputting unit 3. By way of example, the arbitrary position may be a point where the user may want to obtain detailed information on the object displayed in the curved planar regular image C, or may be the center of gravity of an object when the object recognizing technique is applied to recognize the predetermined object.

In the example of FIG. 8, the planar regular image about point G is converted. The operation has been previously described, but the center (point P) of the planar regular image is designated on the fisheye-distorted image S, point Q on the virtual spherical surface corresponding to point P is decided, and $\alpha$ and $\beta$ are calculated from point Q. Then, the tilt angle $\Phi$ of the corrected image is designated and the coefficients A to F are calculated by Expression (3) to (8). The corresponding coordinates of the fisheye-distorted image and the planar regular image are calculated by using A to F and the planar regular image about point G is obtained.

In the example of FIG. 8, moreover, it is assumed that Ci (ui, vi) is selected as the arbitrary point.

When receiving Ci (ui, vi), the parameter inputting unit 3 outputs the input information to the correction parameter calculating part 21. Specifically, the parameter inputting unit 3 outputs the three parameters including the eye vector n, the planar tilt angle $\Phi$ and the magnification m to the correction parameter calculating part 21 in response to a user's instruction.

When receiving an input of a point (an input of Ci (ui, vi)) on the fisheye-distorted image S designated by the parameter inputting unit 3, the correction parameter calculating part 21 calculates the magnification m, the radius R of the fisheye-distorted image, and A to F (Expression (3) to (8)) from the point designated on the fisheye-distorted image S, and outputs them to the corresponding coordinate calculating unit 22.

The corresponding coordinate calculating unit 22 uses the input magnification m, radius R of the fisheye-distorted image, A to F (Expression (3) to (8)) and Expression (12), (13) to calculate point Si(xi, yi) on the fisheye-distorted image S as the corresponding coordinate of Ci(ui, vi).

In other words, the corresponding coordinate calculating unit 22 specifies the pixel information on the fisheye-distorted image S corresponding to the pixel information on the curved planar regular image C.

Specifically, the corresponding coordinate calculating unit 22 specifies a point on the fisheye-distorted image S corresponding to the cut-out center Ci(ui, vi).

That is, as shown in FIG. 9, point Qi on the virtual spherical surface corresponding to point Si(xi, yi) is decided and α' and β' are calculated from point Qi. Then, the tilt angle Φ' of the corrected image is designated and the coefficients A to F (Expression (3) to (8)) are newly calculated. Point Si(xi, yi) on the fisheye-distorted image S is calculated as the corresponding coordinate of Ci(ui, vi) and the information on it is output to the fisheye-distortion correcting unit 1.

The fisheye-distortion correcting unit 1 (an exemplary reconverting unit) sequentially generates the coordinates (u, v) indicating all the pixels on the pixel arrangement configuring the planar regular image T about Ci(ui, vi) as shown in FIG. 10 (that is, like the above conversion), and the pixel values are determined for the individual pixels and are stored in the planar regular image memory 7.

In this way, the planar regular image about point Ci(ui, vi) can be obtained by the image processing apparatus SS.

The exemplary display screens displayed during the reconversion will be described with reference to FIGS. 11 and 12.

Figure 11:
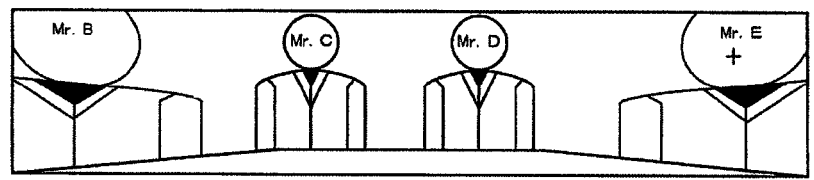
FIG. 11 is diagrams showing exemplary display screens when the planar regular image converted by the basic principle is reconverted.
Figure 11:
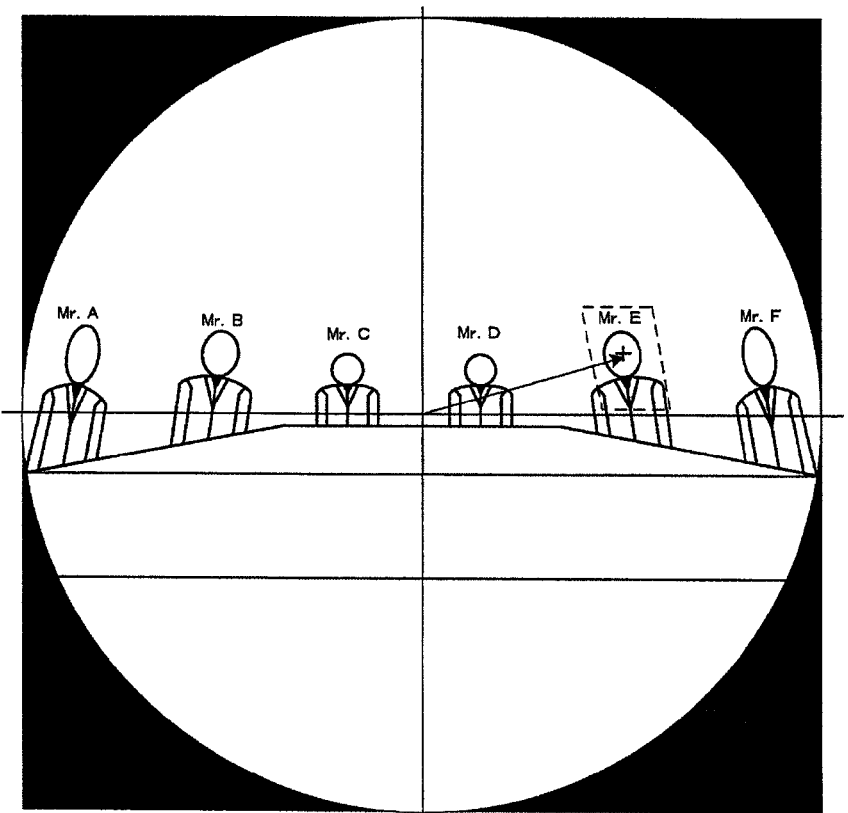
Figure 11:
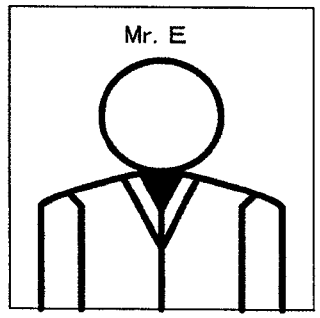
Figure 12:
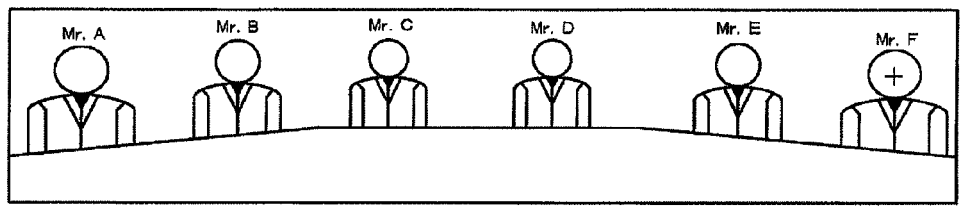
FIG. 12 is diagrams showing exemplary display screens when the planar regular image converted by the conversion into a curved planar regular image is reconverted.
Figure 12:
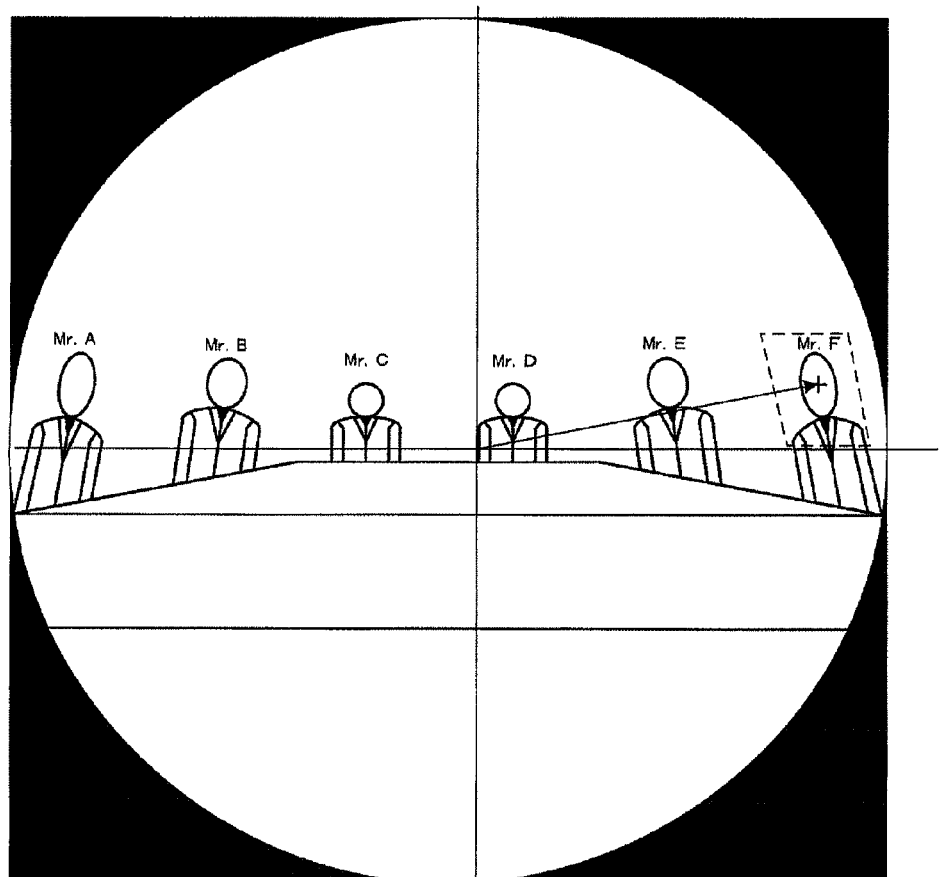
Figure 12:
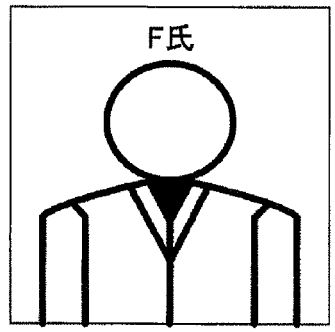

FIG. 11 is diagrams showing an exemplary display screen when the planar regular image converted by the basic principle is reconverted, and FIG. 12 is diagrams showing an exemplary display screen when the planar regular image converted by the conversion into a curved planar regular image is reconverted.

FIG. 11(A) shows how an arbitrary point is selected in the planar regular image converted by the basic principle. The cross mark in FIG. 11(A) indicates an area to which an instruction for the arbitrary point is given by the parameter inputting unit 3 (such as instruction by the pointing device).

FIG. 11(B) is a conceptual diagram showing how a corresponding coordinate of the fisheye-distorted image S is calculated in a predetermined range about the arbitrary point. The predetermined range can be arbitrarily set by the operation of the UV coordinate value generating part 51. The predetermined range is set to be wide so that the layout size of the reconverted planar regular image is enlarged (that is, the number of pixels configuring the planar regular image increases).

As a specific operation, a corresponding position in the fisheye-distorted image is calculated from the angles α, β, Φ and Expression (1), (2) when the position designated in FIG. 11(A) is subjected to distortion correction, as described above. The cut-out area (area to be converted) in the fisheye-distorted image about the calculated position is indicated by a dotted line. The cross mark in FIG. 11(B) indicates a position corresponding to the fisheye-distorted image at the position of interest in FIG. 11(A). The angles α', β, Φ' are newly calculated from the position of the cross mark in the fisheye-distorted image S thereby to update (calculate) the coefficients A to F. The new coefficients A to F and Expression (1), (2) are used to make the distortion correction again and to generate a cut-out corrected image.

FIG. 11(C) shows a reconverted planar regular image. The area indicated by the dotted line in FIG. 11(B) is reconverted to be displayed.

FIG. 12(A) shows how an arbitrary point is selected in a curved planar regular image converted by using the conversion into a curved planar regular image. The cross mark in FIG. 12(A) is similar to that in FIG. 11.

FIG. 12(B) is a conceptual diagram showing how a corresponding coordinate in the fisheye-distorted image S is calculated in a predetermined range about the arbitrary point.

As a specific operation, a corresponding position in the fisheye-distorted image is calculated from the angles α, β, Φ and Expression (12), (13) when the position designated in FIG. 12(A) is subjected to distortion correction, as described above. The cut-out area in the fisheye-distorted image about the calculated position is indicated by a dotted line. The cross mark in FIG. 12(B) indicates a position corresponding to the fisheye-distorted image at the position of interest in FIG. 12(A). The angles α', β', Φ' are newly calculated from the position of the cross mark in the fisheye-distorted image S thereby to update (calculate) the coefficients A to F. The new coefficients A to F and Expression (12), (13) are used to make the distortion correction again and to generate a cut-out corrected image.

FIG. 12(C) shows the reconverted planar regular image. The area indicated by the dotted line in FIG. 12(B) is reconverted to be displayed.

With the above structure, the image processing apparatus SS according to the present embodiment can accurately and effectively recognize an object based on the fisheye-distorted image S photographed at a wide angle. This is because the fisheye-distorted image S is subjected again to the distortion correction to be displayed about the position of the area of interest in the curved planar regular image C and thus the image processing apparatus SS is not influenced by a deterioration in image quality due to a downsizing operation when the curved planar regular image C is displayed to be monitored. When the cut-out corrected image is subjected to digital zooming, a difference between the cut-out methods causes a difference in image quality to be conspicuous. Further, the curved planar regular image C is obtained by the distortion correction and thus a conventional recognizing technique is applicable so that an area of interest can be automatically designated by the recognition. Thus, an object to be monitored can be automatically traced. Further, a person does not need to always monitor the object, thereby avoiding an operational error. Since a plurality of cut-out corrected images at multiple points can be displayed, multiple objects to be monitored can be addressed.

In order to realize a part or entire functions of the fisheye-distortion correcting unit 1, the correction parameter calculating unit 2 and the parameter inputting unit 3, dedicated hardware designed to perform each processing can be applied to a part or entire fisheye-distortion correcting unit 1, the correction parameter calculating unit 2 and the parameter inputting unit 3 (so-called hardware acceleration). This is because since the fisheye-distortion correcting unit 1 and other are realized by the dedicated hardware so that computations can be made in parallel by parallel circuits in the hardware, processing can be performed at a faster speed than instructions are sequentially executed (for example, software is executed by a CPU). Of course, the control devices such as CPU, RAM and ROM (not shown) mounted on the image processing apparatus SS can perform the functions of a part or entire fisheye-distortion correcting unit 1, the correction parameter calculating unit 2 and the parameter inputting unit 3 under control of the software.

The image processing apparatus according to the present invention has the function of converting a part of a fisheye-distorted image photographed by a fisheye lens into a planar regular image, but an image to be converted by the apparatus is not limited to an image photographed by a fisheye lens. For example, any image to which a semispherical projecting model like a fisheye lens is applied, such as image photographed by a convex mirror can be converted by using the image processing apparatus according to the present invention.

[3. Operations of Image Processing Apparatus SS]

The operations of the image processing apparatus SS will be described below with reference to FIG. 13.

Figure 13:
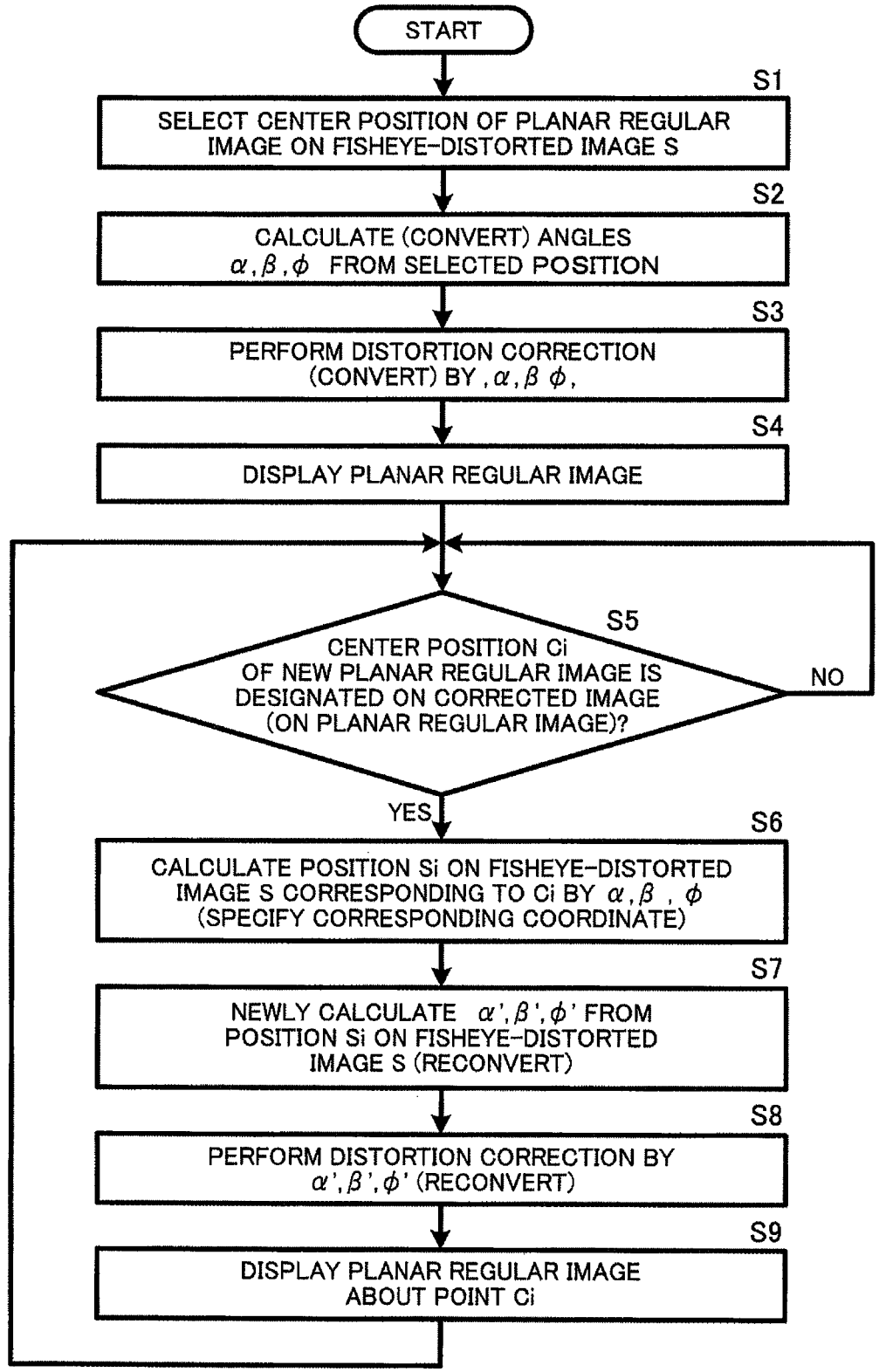
FIG. 13 is a flowchart showing operations of the image processing apparatus SS.

FIG. 13 is a flowchart showing the operations of the image processing apparatus SS.

At first, in order to perform the above conversion for converting the fisheye-distorted image S and displaying the planar regular image T or the curved planar regular image C (which will be collectively called "planar regular image" below) on the displaying part, when a cut-out center P (xo, yo) of the fisheye-distorted image S is selected based on the user's operation of the parameter inputting unit 3 or by using a value preset in the image processing apparatus SS (step S1), the selected information is output as the parameter to the correction parameter calculating part 21.

When being given the eye vector n and the planar tilt angle $\Phi$ from the parameter inputting unit 3, the correction parameter calculating part 21 calculates the azimuth angle $\alpha$ and the zenith angle $\beta$ based on the eye vector n and calculates the rotation coefficients A, B, C, D, E, F based on Expression (3) to (8) (step S2) to output the calculated values to the fisheye-distortion correcting unit 1.

Then, the fisheye-distortion correcting unit 1 uses the calculation results ($\alpha$, $\beta$, $\Phi$) input from the correction parameter calculating part 21 to convert the fisheye-distorted image S into the planar regular image, and the planar regular image memory controller 52 displays the planar regular image on the display screen (step S4).

When the user designates an arbitrary point Ci(ui, vi) of the displayed planar regular image based on the operation of the parameter inputting unit 3 (step S5: YES), the corresponding coordinate calculating unit 22 decides point Qi on the virtual spherical surface corresponding to point Si(xi, yi) to calculate $\alpha'$, $\beta'$ from point Qi. Then, the tilt angle $\Phi'$ of the corrected image is designated and the coefficients A to F are newly calculated (by Expression (3) to (8)). Point Si(xi, yi) on the fisheye-distorted image S as a corresponding coordinate of Ci(ui, vi) is calculated and the information on it is output to the fisheye-distortion correcting unit 1 (steps S6 and S7).

In step S8, the fisheye-distortion correcting unit 1 generates a planar regular image about point Ci(ui, vi) based on the information input from the corresponding coordinate calculating unit 22 (that is, makes the distortion correction by using $\alpha'$, $\beta'$, $\Phi'$).

The planar regular image memory controller 52 displays the reconverted planar regular image on the display screen (step S9).

[4. Display Form of Reconverted Planar Regular Image]

A display form of the reconverted planar regular image will be described below with reference to FIGS. 14 to 16.

The image processing apparatus according to the present embodiment can designate arbitrary points Ci(ui, vi) of multiple planar regular images to reconvert them, and can display the converted planar regular images on the displaying part.

Specifically, for example, each time the arbitrary point Ci(ui, vi) is designated, point Si(xi, yi) on the fisheye-distorted image S corresponding to the designated point Ci(ui, vi) is calculated thereby to generate a planar regular image about point Ci(ui, vi) (an exemplary screen information of the present application). The generated planar regular images may be displayed side by side on the displaying part.

The planar regular images may be generated by the planar regular image memory controller 52 like the above conversion.

Figure 14:
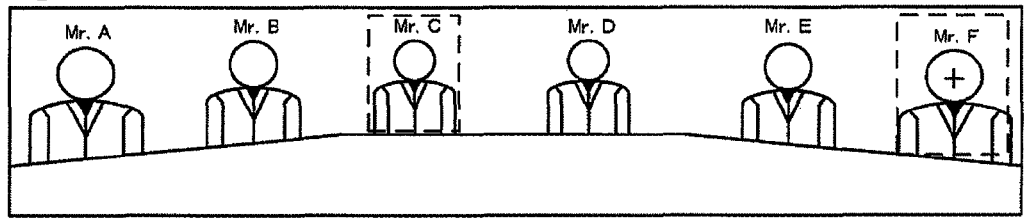
FIG. 14 is diagrams showing exemplary screens in which planar regular images reconverted each time an arbitrary point Ci(ui, vi) is designated are displayed side by side.
Figure 14:
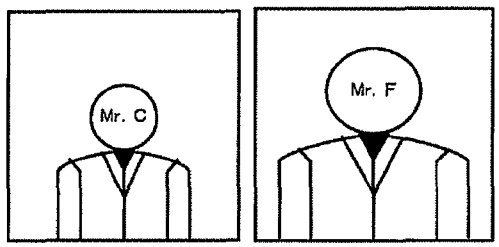
Figure 14:
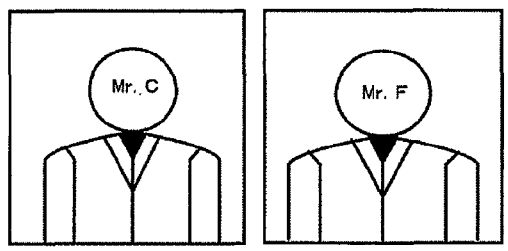
Figure 14:
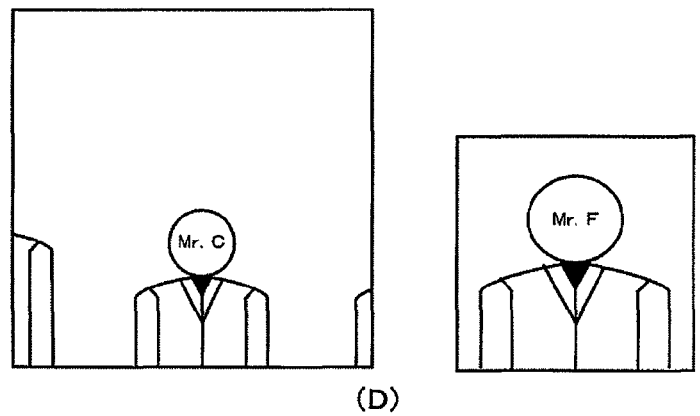
Figure 14:
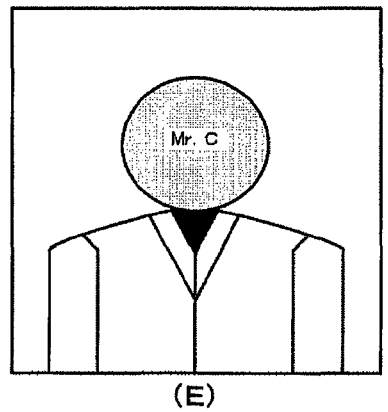

FIG. 14 is diagrams showing an exemplary screen on which the planar regular images reconverted each time an arbitrary point Ci(ui, vi) is designated are displayed side by side. The broken lines in FIG. 14 indicate that objects to be reconverted are selected.

FIG. 14(A) shows how Mr. C and Mr. E are sequentially designated as the arbitrary point Ci(ui, vi).

The generated planar regular images are displayed side by side in FIG. 14(B). In the example of FIG. 14(B), Mr. F looks larger than Mr. C due to a distance between the camera and the subjects.

FIG. 14(C) shows an exemplary display when only Mr. F is reduced in size to be displayed and Mr. C and Mr. F are matched with each other in size. In this way, the magnification m has only to be changed in order to change the display size of the subjects.

In order to change the magnification m, the correction parameter calculating part 21 may calculate the magnification m under control of the CPU (not shown) or a display control unit may be newly provided in the block diagram of FIG. 6 to cause the unit to change the magnification m. The change of the magnification m may be performed by the planar regular image memory controller 52 as an exemplary display controlling unit.

FIG. 14(D) shows an exemplary display when an area in the planar regular image T to be reconverted is enlarged and only the screen on which Mr. C is displayed (the left window size) is enlarged (that is, the display area is enlarged). In order to enlarge the display area, the coordinates (u, v) for the enlarged display area may be generated by the uv coordinate value generating part 51. The generated coordinates (u, v) are given from the uv coordinate value generating part 51 to the corresponding coordinate calculating unit 4 to calculate the corresponding coordinates (x, y) corresponding to the coordinates (u, v), and consequently the planar regular image is reconverted.

The display area of Mr. C in FIG. 14(D) is enlarged compared with the display area in which Mr. C is displayed in FIG. 14(B). It can be seen that even the shoulders of Mr. B and Mr. D, not displayed in FIG. 14(B), are displayed in the display area of Mr. C in FIG. 14(D).

FIG. 14(E) shows an example in which the display area and the display size of Mr. F are enlarged, respectively, as a result of an increase in the magnification m and an enlargement in the display area.

By displaying as the above described, a more detailed image of the subject displayed in the display area can be obtained.

There will be described below with reference to FIG. 15 an example in which the subject displayed in the reconverted planar regular image is recognized by an object recognizing technique to be reconverted and displayed with a predetermined position of the recognized subject as the arbitrary point Ci (ui, vi).

Figure 15:
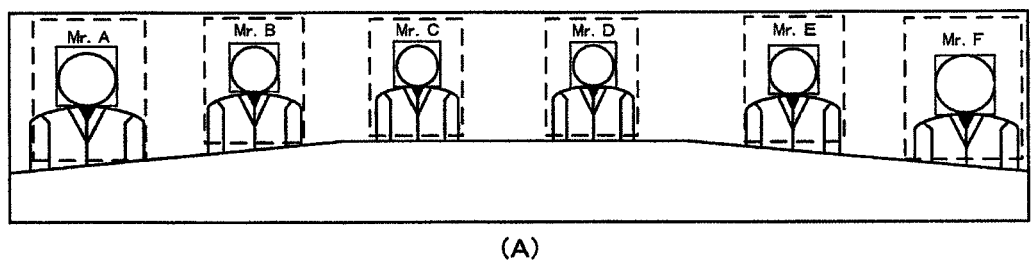
FIG. 15 is diagrams showing exemplary displays in which the planar regular images are reconverted by an object recognizing technique.
Figure 15:
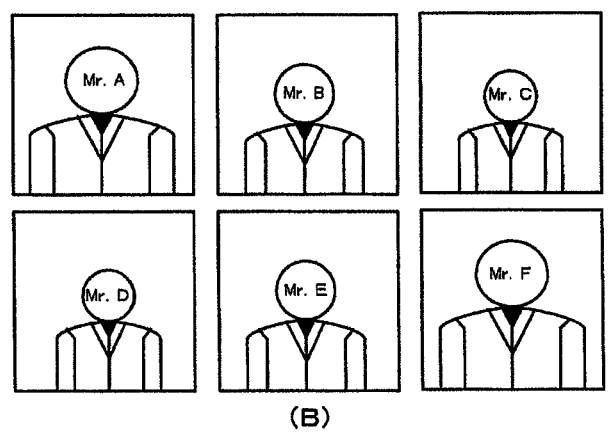

FIG. 15 is diagrams showing an exemplary display subjected to the reconversion by the object recognizing technique.

The object recognizing technique is well known and thus a detailed explanation thereof will be omitted, but an object is first recognized by a pattern matching method or characteristic point extracting method generally known as the object recognizing technique. A preset point (such as center of gravity of the object) in the recognized object may be reconverted to be displayed as the arbitrary point Ci (ui, vi). The object recognizing structure is such that object recognizing unit formed of the CPU and the like is added to the exemplary structure of FIG. 6, for example.

FIG. 15(A) shows that a rectangular solid line in the planar regular image indicates an image of a recognized person's face by the object recognition. The dotted lines indicate cut-out areas of the corresponding fisheye-distorted image S.

FIG. 15(B) shows an exemplary display subjected to the reconversion (that is, an exemplary cut-out corrected image display). As shown in FIG. 15(B), a plurality of objects can be addressed. Even when the object is moving, it can be automatically traced. The automatic tracing can be realized by calculating an optical flow and performing a well-known trace processing by the characteristic point extracting method.

The arbitrary points Ci(ui, vi) of the image to be reconverted may be selected by the pointing device (that is, designated by a human operation).

Figure 16:
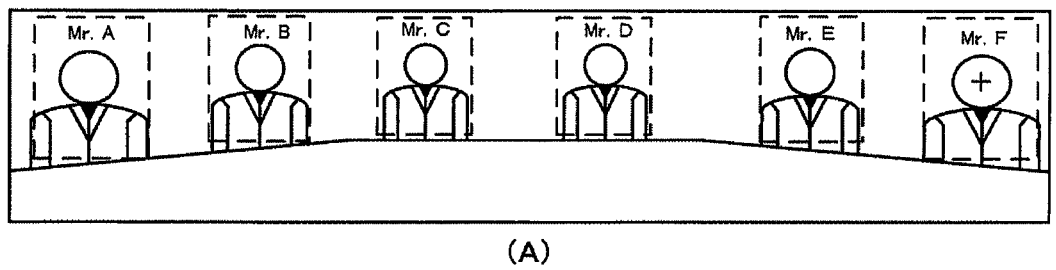
FIG. 16 is diagrams showing how a plurality of arbitrary points Ci(ui, vi) are selected by a pointing device (that is, designated by a human operation)
Figure 16:
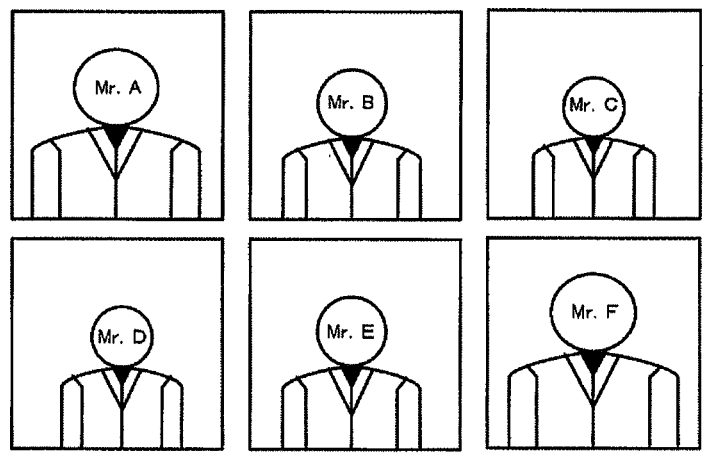

FIG. 16 shows how the arbitrary points Ci(ui, vi) are selected by the pointing device (that is, designated by a human operation).

FIG. 16(A) shows a cross mark (pointing marker) indicating that a dotted rectangular area in the planar regular image is designated as a cut-out area by the pointing device.

FIG. 16(B) shows an exemplary display subjected to the reconversion (an exemplary cut-out corrected image display).

The cut-out area designated by the pointing device is displayed in a new window thereby to address a plurality of objects. Not only the cut-out corrected image is displayed on a new window but also a cut-out corrected image whose position of interest is updated can be displayed in a designated window. Even when the object to be monitored is moving, the cut-out area can be manually updated and traced.

[5. Exemplary Application to Monitoring Camera System]

An example in which the image processing apparatus SS is applied to a monitoring camera system will be described below with reference to FIG. 17.

Figure 17:
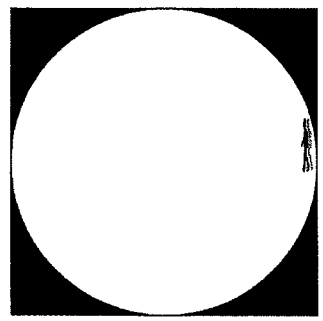
FIG. 17 is conceptual diagrams showing an example in which the image processing apparatus SS is applied to a monitoring camera system.
Figure 17:
Figure 17:
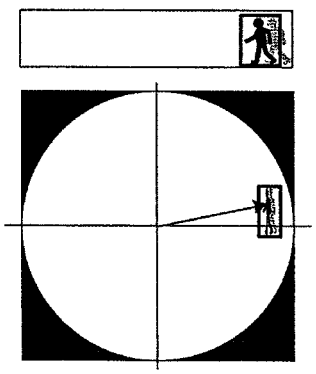
Figure 17:
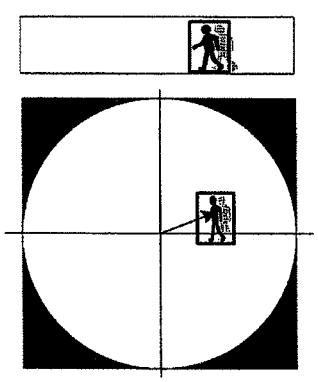
Figure 17:
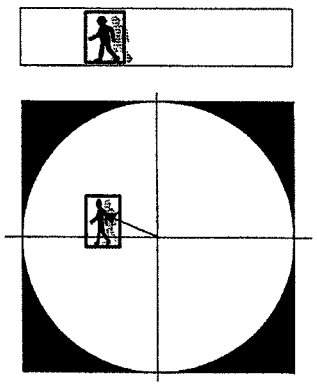
Figure 17:
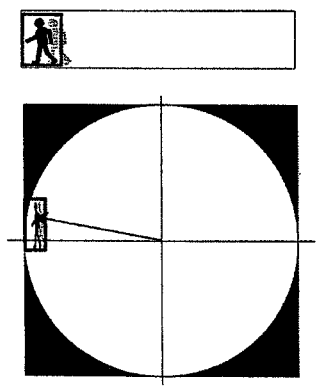

FIG. 17 is conceptual diagrams showing an example in which the image processing apparatus SS is applied to a monitoring camera system.

The image processing apparatus SS according to the present embodiment further includes a digital camera (any device capable of outputting a fisheye-distorted image to the image processing apparatus SS may be employed) mounting a fisheye lens (a wide-angle lens or omnidirectional mirror may be employed) thereon and the display device, and additionally object recognizing unit for recognizing a specific object displayed in the converted planar regular image and an operation recognizing unit for recognizing a successive change indicated by the recognized object in the planar regular image per planar regular image in addition to the structure of FIG. 6. Pixel information on the fisheye-distorted image corresponding to an arbitrary point on the object per planar regular image recognized by the operation recognizing unit is specified to be reconverted based on the specified position. The object recognizing unit and the operation recognizing unit may be realized by the CPU and the like.

FIG. 17(A) shows a fisheye-distorted image and FIG. 17(B) shows the converted planar regular image (that is, the planar regular image generated from the fisheye-distorted image by the image processing apparatus SS).

As shown in FIG. 17(A), the fisheye-distorted image is largely distorted according to distance from its center and thus is difficult to use with the conventional object recognizing technique, as stated above. As also described above, the planar regular image shown in FIG. 17(B) can display a regular person therein for a wide angle, and thus can be used with the conventional object recognizing technique.

The monitoring camera system can automatically detect a position of an object to be monitored and can continuously monitor the detected object to be monitored by applying the object recognizing technique to the planar regular image.

Specifically, as shown in FIG. 17(C), a position to be monitored on the fisheye-distorted image corresponding to the position to be monitored, which is automatically detected on the planar regular image by the application of the present invention, can be successively (continuously) calculated. The object to be monitored can be automatically traced by making the position to be monitored on the fisheye-distorted image as the center of the cut-out corrected image (that is, by the reconversion).

With a specific explanation of FIG. 17(C), the upper diagrams of FIG. 17(C)-(1) to (4) are converted planar regular images (FIG. 17(C) shows how a person is moving from left to right in the order of (1) to (4)).

A position corresponding to the fisheye-distorted image (center diagram) at the detected position on the planar regular image is calculated by the reconversion. The lower diagrams show the cut-out corrected images (that is, reconverted planar regular images) about the calculated position to be monitored on the fisheye-distorted image. The position of the object to be monitored, which is automatically detected by the object recognizing technique, keeps being updated to the center position of the cut-out corrected image (that is, the arbitrary point Ci(ui, vi)) and the reconverted image is displayed with reference to the center position, thereby automatically tracing the object to be monitored.

[6. Exemplary Application to TV Conference System]

An example in which the image processing apparatus SS is applied to a monitoring camera system will be described below with reference to FIGS. 18 and 19.

Figure 18:
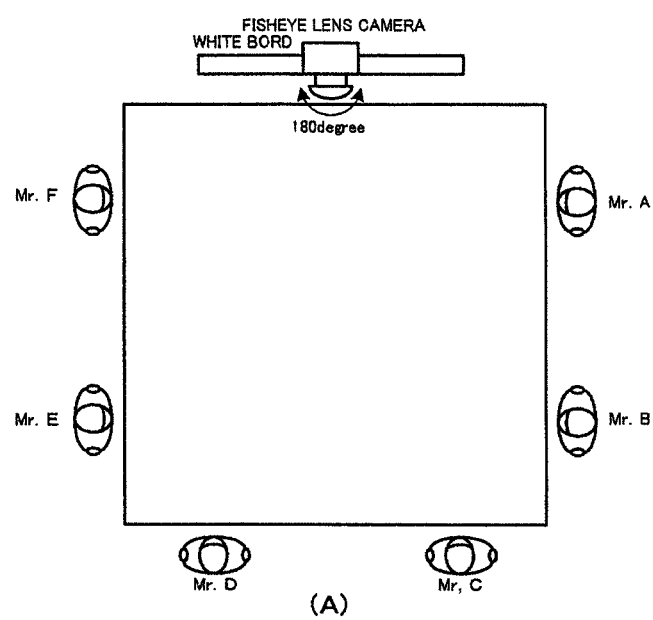
FIG. 18 is conceptual diagrams showing an example in which the image processing apparatus SS is applied to a TV conference system when the fisheye lens camera is arranged sideways.
Figure 18:
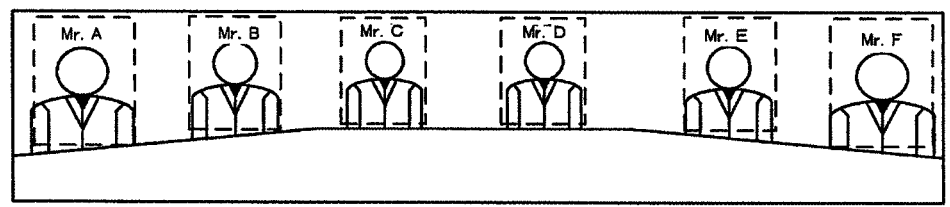
Figure 18:
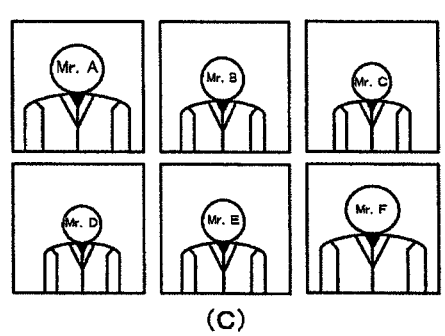
Figure 18:
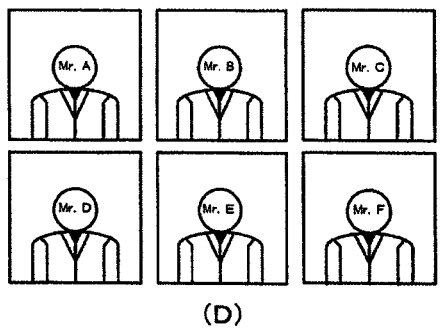
Figure 19:
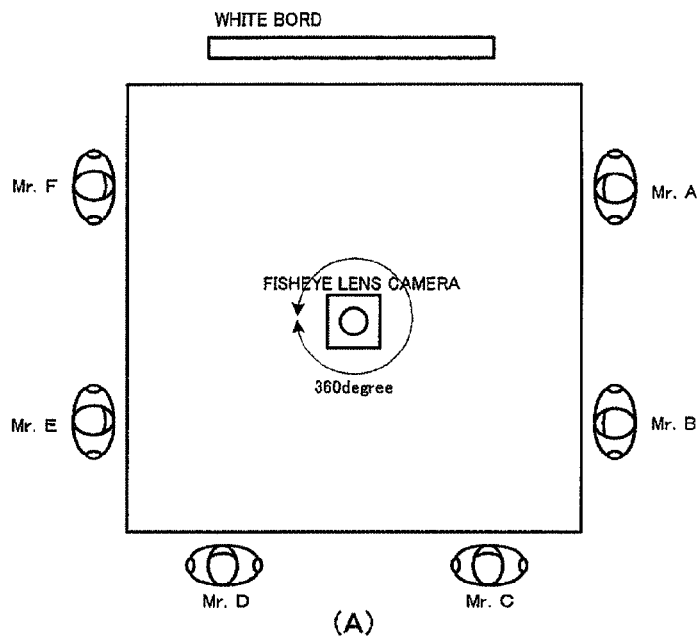
FIG. 19 is conceptual diagrams showing an example in which the image processing apparatus SS is applied to the TV conference system when the fisheye lens camera is faced upward.
Figure 19:
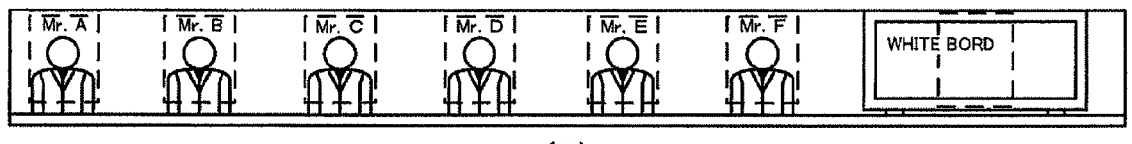
Figure 19:
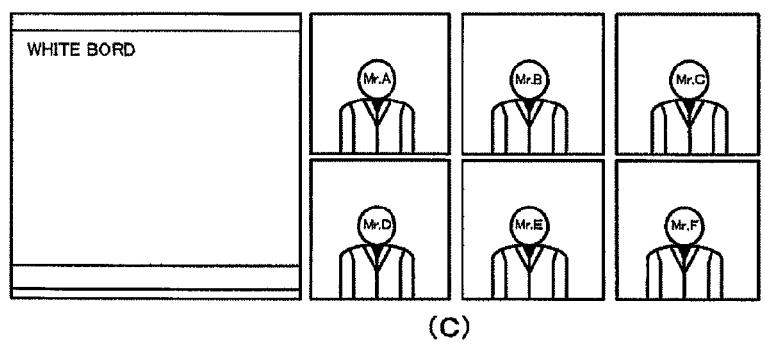

FIG. 18 is conceptual diagrams showing an example in which the image processing apparatus SS is applied to a TV conference system when the fisheye lens camera is arranged sideways, and FIG. 19 is conceptual diagrams showing an example in which the image processing apparatus SS is applied to the TV conference system when the fisheye lens camera is faced upward.

The image processing apparatus SS according to the present embodiment further includes a digital camera (any device capable of outputting a fisheye-distorted image to the image processing apparatus SS may be employed) mounting a fisheye lens (a wide-angle lens or omnidirectional mirror may be employed) thereon and a display device, and an object recognizing unit in addition to the structure of FIG. 6. The object recognizing unit may be realized by the CPU and the like.

FIG. 18(A) is a schematic diagram showing an example in which the fisheye lens camera facing in a lateral direction is arranged in a conference room. In this case, for example, the fisheye lens camera is arranged on the wall, and is arranged opposite to a subject person.

FIG. 18(B) shows a planar regular image converted in the present system. As shown in FIG. 18(B), since the planar regular image at a wide angle of about 180 degrees can be obtained, a plurality of conference participants can be displayed by one fisheye lens camera.

FIG. 18(C) shows an example in which the object recognizing technique is applied to recognize conference participants (persons) and the conference participants are reconverted with preset points of the recognized persons (such as centers of gravity of the persons) as the arbitrary points Ci (ui, vi) to display the planar regular image.

The conference participants are displayed in split windows and thus can be observed in detail as the planar regular images at the same time.

As shown in FIG. 18(D), the magnification for enlarging/reducing the image in size in each window is individually changed, thereby displaying the persons at a unified size irrespective of the distance to the camera.

When the fisheye lens camera is faced in a lateral direction, the fisheye-distortion correction is made in the direction of FIG. 5(A).

FIG. 19(A) is a schematic diagram showing an example in which the fisheye lens camera facing upward is arranged in a conference room. In this case, for example, the fisheye lens camera is faced upward on the table and is arranged in parallel to a subject person.

FIG. 19(B) shows a planar regular image converted in the present system. As shown in FIG. 19(B), since the planar regular image at a wide angle of about 360 degrees can be obtained, all the conference participants can be displayed by one fisheye lens camera.

FIG. 19(C) shows an example in which the object recognizing technique is applied to recognize the conference participants (persons) and the conference participants are reconverted with preset points of the recognized persons (such as centers of gravity of the persons) as the arbitrary points $Ci(ui, vi)$ to display the planar regular image.

The conference participants are displayed in split windows and thus can be observed in detail as the planar regular images at the same time.

[7. Exemplary Application to Pan/Tilt/Zoom Camera]

An example in which the image processing apparatus SS is applied to a pan/tilt/zoom camera will be described below with a comparison between FIGS. 20 and 21.

Figure 20:
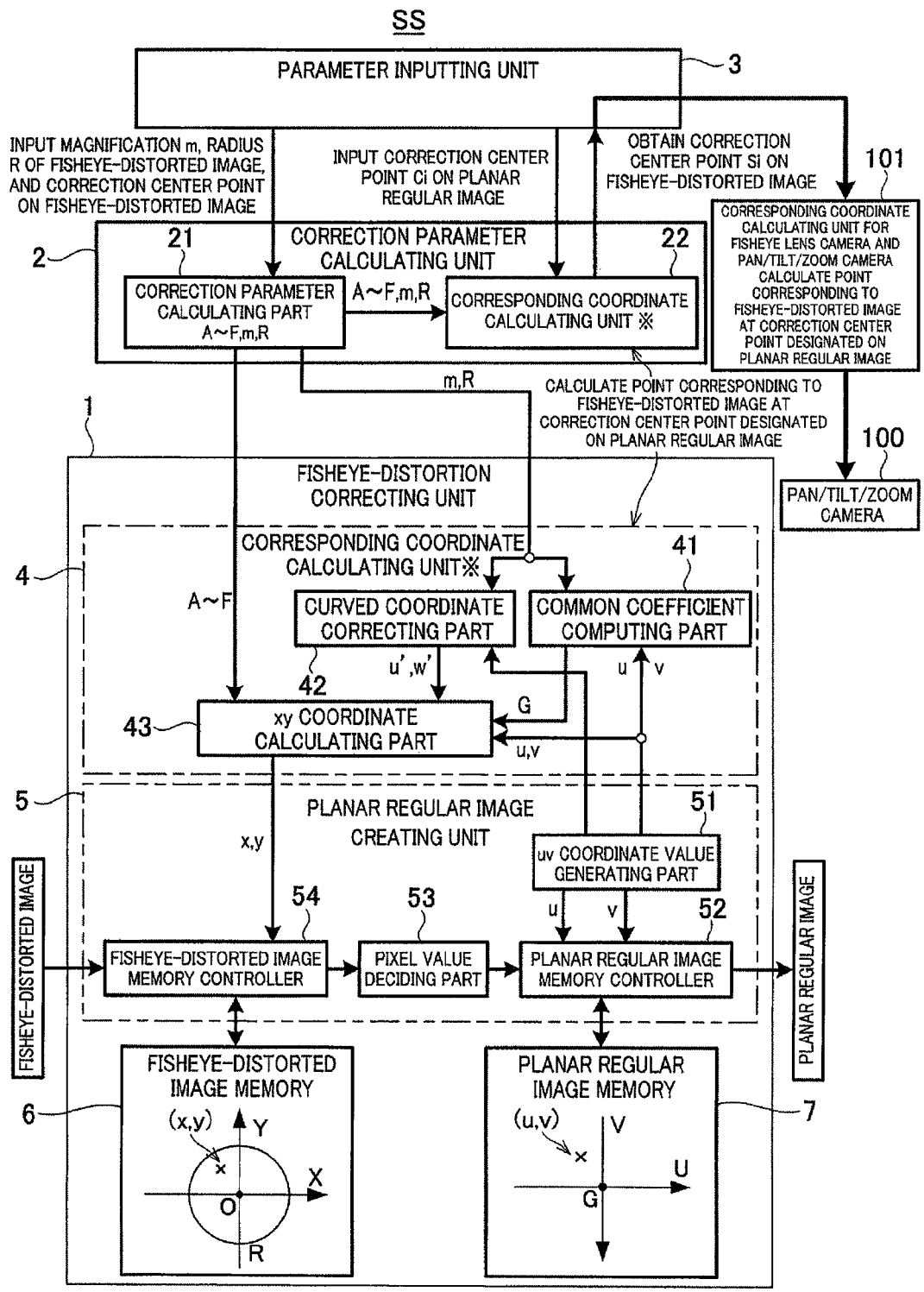
FIG. 20 is a block diagram showing a case in which the image processing apparatus SS is applied to a pan/tilt/zoom camera.
Figure 21:
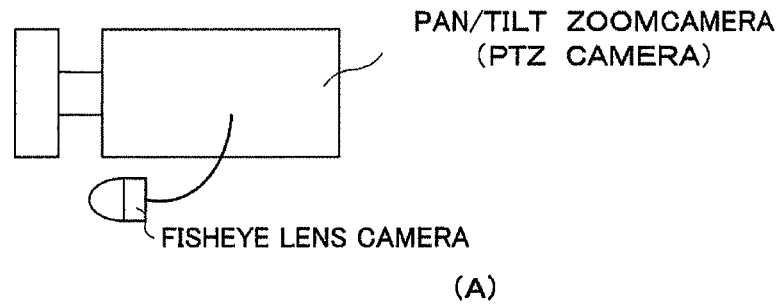
FIG. 21 is conceptual diagrams showing a case in which the image processing apparatus SS is applied to the pan/tilt/zoom camera.
Figure 21:
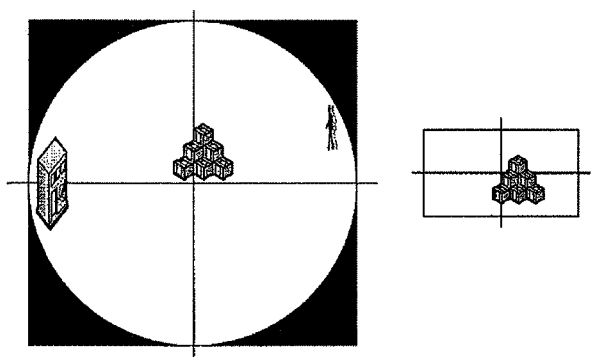
Figure 21:
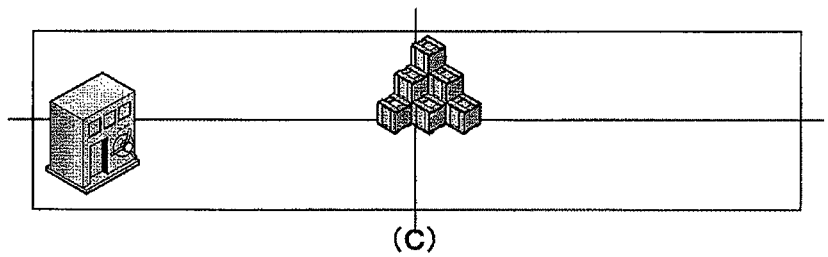
Figure 21:
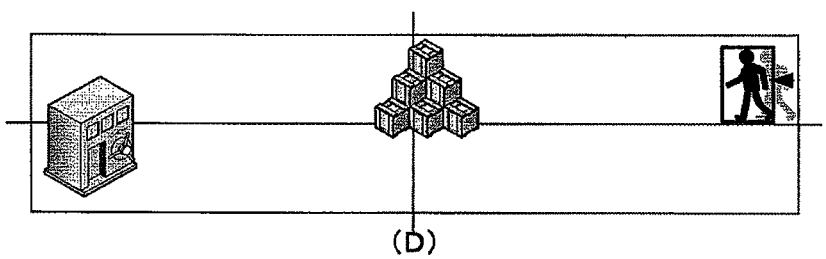
Figure 21:
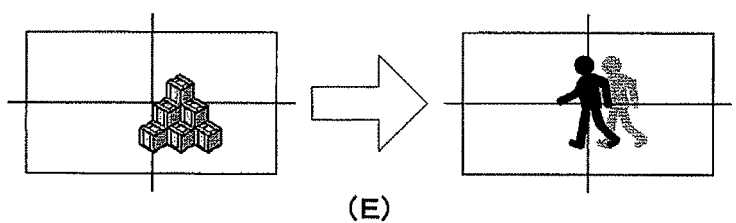

FIG. 20 is a block diagram showing the case in which the image processing apparatus SS is applied to a pan/tilt/zoom camera, and FIG. 21 is conceptual diagrams showing the case in which the image processing apparatus SS is applied to the pan/tilt/zoom camera.

As shown in FIG. 20, in the block diagram showing the case in which the image processing apparatus SS is applied to a pan/tilt/zoom camera, the previously-shown block diagram of the image processing apparatus SS is added with a digital camera (fisheye lens camera, any device capable of outputting a fisheye-distorted image to the image processing apparatus SS may be employed) mounting a fisheye lens (a wide-angle lens or omnidirectional mirror may be employed) thereon, a pan/tilt/zoom camera 100 (a monitoring camera of the present application) and a corresponding coordinate calculating unit 101 (an exemplary position controlling unit of the present application) for fisheye lens camera and pan/tilt/zoom camera.

The pan/tilt/zoom camera 100 includes a mechanism part capable of driving an orientation of the camera lens in the horizontal direction and in the vertical direction, and an optical zoom mechanism.

The corresponding coordinate calculating unit 101 for fisheye lens camera and pan/tilt/zoom camera outputs a control signal for controlling a position of the pan/tilt/zoom camera 100 in a predetermined direction to the pan/tilt/camera 100. A driving part of the pan/tilt/zoom camera 100 is driven to the position indicated by the control signal in response to the control signal.

FIG. 21(A) is a conceptual diagram showing the case in which the image processing apparatus SS is applied to the pan/tilt/zoom camera. As shown in FIG. 21(A), the fisheye lens camera and the pan/tilt/zoom camera are connected to exchange information each other.

It is generally known that the pan/tilt/zoom camera 100 can photograph an image with less distortion (that is, can photograph an image with high viewability) but has a narrow angle and a blind angle can occur therein due to pan/tilt. The present embodiment is configured such that the image processing apparatus SS is applied to the pan/tilt/zoom camera 100 to grasp an object to be monitored from the image photographed by the wide-angle fisheye lens and to photograph the object to be monitored as an image with high viewability by the pan/tilt/zoom camera 100.

In order to realize the operations of the present embodiment, the corresponding coordinate calculating unit 101 for fisheye lens camera and pan/tilt/zoom camera transmits position information on the object to be monitored, which is calculated by the fisheye lens camera, to the pan/tilt/zoom camera 100, and thereby controls the pan/tilt/zoom camera.

The concept of the control will be described with reference to FIGS. 21(B) to 21(E).

The left diagram in FIG. 21(B) shows a fisheye-distorted image photographed by a fisheye lens camera and the right diagram in FIG. 21(B) shows a planar regular image photographed by the pan/tilt/zoom camera 100. When the photographing centers are compared, it can be seen that a difference occurs between the centers of the coordinate systems depending on the camera-arranged position. The corresponding coordinate calculating unit 101 for fisheye lens camera and pan/tilt/zoom camera calculates a difference (which will be called "difference in center positions" below) between the photographing center of the fisheye-distorted image photographed by the fisheye lens camera (an exemplary first photographing center) and the photographing center of the planar regular image photographed by the pan/tilt/zoom camera 100 (a second photographing center). The difference in center positions may be previously stored.

Since the image angle photographed by the fisheye lens is previously determined, an actual distance between the photographing center and an object present in the photographed image (which will be called "position information obtained from fisheye lens camera" below) can be grasped. Similarly, since the image angle photographed by the pan/tilt/zoom camera 100 is also previously determined, an actual distance between the photographing center and an object present in the photographed image (which will be called "position information by the pan/tilt/zoom camera 100" below) can be grasped.

The present embodiment is such that distance information for setting the photographing center of the pan/tilt/zoom camera 100 is calculated based on the position information obtained from the fisheye lens camera and the position information by the pan/tilt/zoom camera 10, and a control signal for moving the photographing center of the pan/tilt/zoom camera 100 to the position indicated by the distance information is output to the pan/tilt/zoom camera 100.

When a fisheye-distorted image is converted and a planar regular image is displayed (FIG. 21(C)) and an object to be monitored in the planar regular image is selected (for example, selected by the pointing device or recognized by the object recognizing technique) (FIG. 21(D)), the corresponding coordinate calculating unit 101 for fisheye lens camera and pan/tilt/zoom camera calculates a coordinate $Si$ of the fisheye-distorted image corresponding to a predetermined position (such as center of gravity) of the object to be monitored, which is selected as the center coordinate $Ci$ for the reconversion.

The corresponding coordinate calculating unit 101 for fisheye lens camera and pan/tilt/zoom camera calculates the difference in center position and the position information obtained from the fisheye lens camera at $Si$ as the distance information, and transmits the control signal to the driving part of the pan/tilt/zoom camera 100 such that the position information obtained from the fisheye lens camera and $Si$ are the photographing center of the pan/tilt/zoom cameral 100 based on the calculated distance information.

The pan/tilt/zoom camera 100 performs pan/tilt/zoom thereby to photograph an object to be monitored (FIG. 21(E)).

The present invention and the pan/tilt/zoom camera are used together, thereby efficiently controlling the pan/tilt/zoom camera.

The operations of the image processing apparatus SS when the image processing apparatus SS is applied to the pan/tilt/zoom camera will be described below with reference to FIG. 22.

Figure 22:
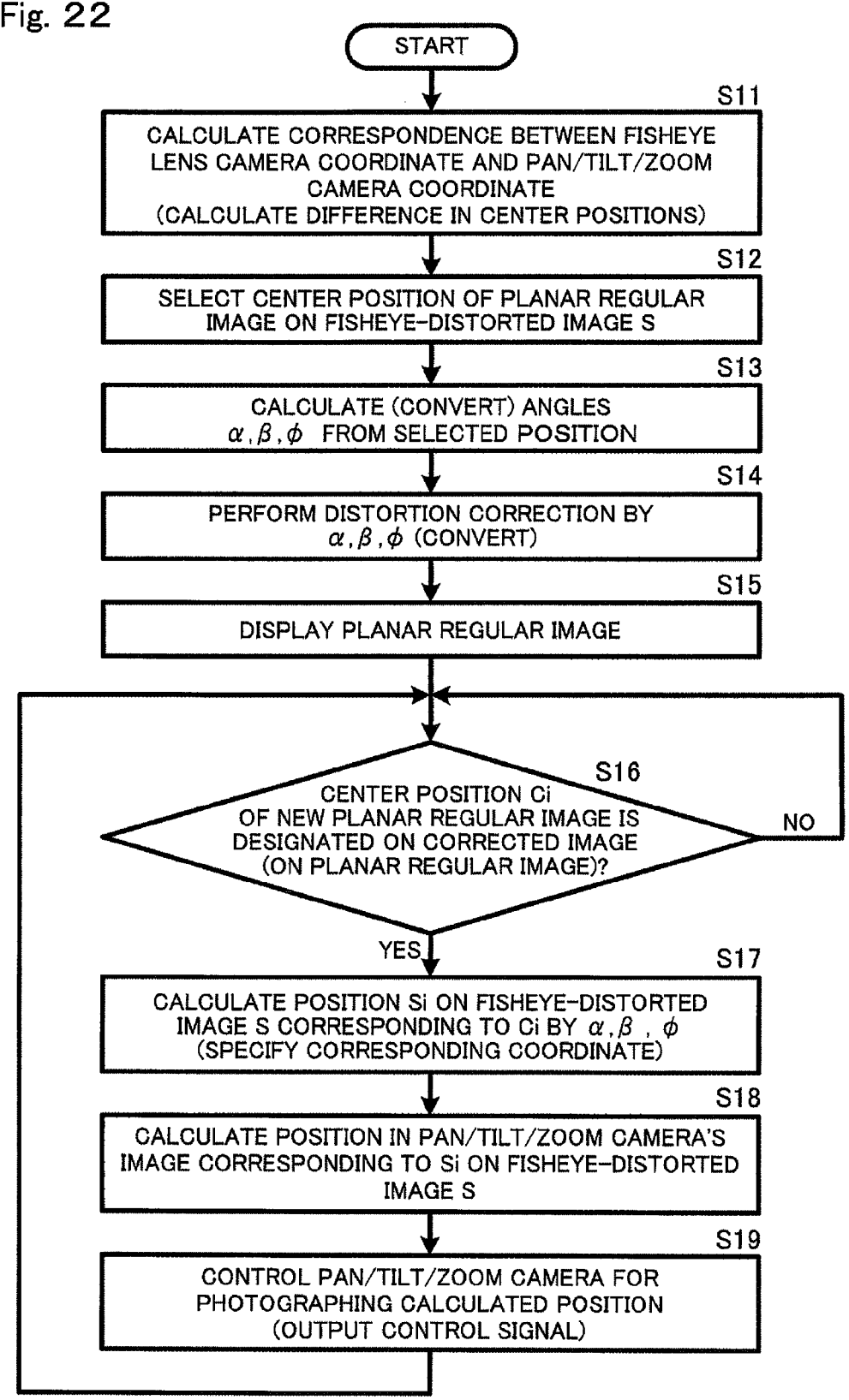
FIG. 22 is a flowchart showing operations of the image processing apparatus SS when the image processing apparatus SS is applied to the pan/tilt/zoom camera.

FIG. 22 is a flowchart showing the operations of the image processing apparatus SS when the image processing apparatus SS is applied to the pan/tilt/zoom camera.

At first, the corresponding coordinate calculating unit 101 for fisheye lens camera and pan/tilt/zoom camera calculates a difference between the photographing center of the fisheye-distorted image photographed by the fisheye lens camera and the photographing center of the planar regular image photographed by the pan/tilt/zoom camera 100 ("difference in center positions") (step S11).

In order to convert the fisheye-distorted image S and display the planar regular image on the displaying part, when the cut-out center P(X0, Y0) of the fisheye-distorted image S is selected based on the user's operation of the parameter inputting unit 3 or by using the values preset in the image processing apparatus SS (step S12), the selected information is output as the parameter to the correction parameter calculating part 21.

When being given the eye vector n and the planar tilt angle Φ from the parameter inputting unit 3, the correction parameter calculating part 21 calculates the azimuth angle α and the zenith angle β based on the eye vector n, and calculates the rotation coefficients A, B, C, D, E, F based on Expression (3) to (8) (step S13) and outputs them to the fisheye-distortion correcting unit 1.

The fisheye-distortion correcting unit 1 uses the calculation results (α, β, Φ) input from the correction parameter calculating part 21 to convert the fisheye-distorted image S into the planar regular image (step S14), and the planar regular image memory controller 52 displays the planar regular image on the display screen (step S15).

When an object to be monitored in the planar regular image is selected (step S16: YES), the coordinate Si of the fisheye-distorted image corresponding to a predetermined position (such as center of gravity) of the object to be monitored, which is selected as the center coordinate Ci for the reconversion, is calculated (step S17).

The corresponding coordinate calculating unit 101 for fisheye lens camera and pan/tilt/zoom camera transmits the control signal to the driving part of the pan/tilt/zoom camera 100 such that the position information obtained from the fisheye lens camera and the Si are the photographing center of the pan/tilt/zoom camera 100 based on the position information obtained from the fisheye lens camera at Si (step S18).

Then, the pan/tilt/zoom camera 100 performs pan/tilt/zoom thereby to photograph an object to be monitored (step S19).

The embodiment described above does not limit the invention within the scope of claims. All the combinations of structures described in the embodiment are not necessarily essential for solving the problems of the invention.

As described above, when receiving an instruction of selecting an arbitrary point Ci(ui, vi) of a 2D-viewable planar regular image generated based on a fisheye-distorted image S photographed by a fisheye lens, the embodiment calculates point Si(xi, yi) on the fisheye-distorted image S as a corresponding coordinate of Ci(ui, vi), and newly generates a pixel information group configuring the planar regular image about Ci(ui, vi) based on a pixel information group configuring the fisheye-distorted image S, and thus can accurately and effectively recognize an object based on the fisheye-distorted image photographed at a wide angle.

There has been described in the embodiment with the case in which the present application is applied to the image processing apparatus, but the embodiment may be applied to electronic devices such as digital video camera, digital camera, personal computer and home appliance.

DESCRIPTION OF REFERENCE NUMERALS

1: Fisheye-distortion correcting unit
2: Correction parameter calculating unit
3: Parameter inputting unit
4: Corresponding coordinate calculating unit
5: Planar regular image creating unit
6: Fisheye-distorted image memory
7: Planar regular image memory
S: Image processing apparatus

What is claimed is:

1. An image processing apparatus comprising:
distorted circular image storing unit that stores a pixel information group configuring a distorted circular image generated based on the externally-input distorted circular image photographed by a wide-angle lens or omnidirectional mirror;
converting unit that converts the stored pixel information group configuring the distorted circular image into a pixel information group configuring a 2D-viewable planar regular image;
planar regular image storing unit that stores the pixel information group configuring the converted planar regular image;
selection-instruction receiving unit that receives an instruction of selecting pixel information corresponding to an arbitrary point on the stored planar regular image;
corresponding coordinate specifying unit that specifies pixel information on a distorted circular image corresponding to the pixel information on the selection-instructed planar regular image; and
reconverting unit that reconverts the stored pixel information group configuring the distorted circular image into a pixel information group configuring a 2D-viewable planar regular image about the specified pixel information.

2. The image processing apparatus according to claim 1, comprising:
screen information generating unit that generates screen information having a predetermined size to be displayed on a displaying part based on the pixel information group configuring the reconverted planar regular image.

3. The image processing apparatus according to claim 1, wherein the selection-instruction receiving unit receives an instruction of selecting pixel information corresponding to multiple points on the planar regular image converted by the converting unit;
the corresponding coordinate specifying unit specifies pixel information on a distorted circular image corresponding to the respective items of pixel information on the selection-instructed planar regular image, and
the reconverting unit reconverts the stored pixel information group configuring the distorted circular image into a pixel information group configuring a 2D-viewable planar regular image about the respective items of specified pixel information per pixel information specified by the corresponding coordinate specifying unit.

4. The image processing apparatus according to claim 3, comprising:

display controlling unit that controls a display form such that each item of the generated screen information is displayed at the same size on the displaying part.

5. The image processing apparatus according to any one of claim 1, comprising:
   object recognizing unit that recognizes a predetermined object displayed on the converted planar regular image,
   wherein the selection-instruction receiving unit receives an instruction of selecting pixel information corresponding to an arbitrary point on the recognized object.

6. An image processing apparatus comprising:
   distorted circular image storing unit for storing a pixel information group configuring multiple distorted circular images generated based on the externally-input distorted circular images obtained by continuously photographing a subject by a wide-angle lens or omnidirectional mirror in correspondence to each distorted circular image;
   converting unit that converts the stored pixel information group configuring the distorted circular image into a pixel information group configuring a 2D-viewable planar regular image per distorted circular image;
   planar regular image storing unit that stores the converted pixel information group configuring the planar regular image;
   object recognizing unit that recognizes a specific object displayed on the converted planar regular image;
   operation recognizing unit that recognizes a successive change indicated by the recognized object on the planar regular images per planar regular image;
   second corresponding coordinate specifying unit that specifies pixel information on a distorted circular image corresponding to an arbitrary point on an object per planar regular image recognized by the operation recognizing unit; and
   reconverting unit that reconverts the pixel information group configuring the distorted circular image into a pixel information group configuring a 2D-viewable planar regular image about the pixel information on each distorted image specified by the second corresponding coordinate specifying unit per pixel information specified by the second corresponding coordinate specifying unit.

7. A conference system comprising:
   a camera for outputting a subject photographed by a wide-angle lens or omnidirectional mirror as a distorted circular image to an image processing apparatus; and
   the image processing apparatus for generating screen information based on the input distorted circular image and outputting it to a terminal device,
   the image processing apparatus comprising:
   distorted circular image storing unit that stores a pixel information group configuring the distorted circular image generated based on the input distorted circular image;
   converting unit that converts the stored pixel information group configuring the distorted circular image into a pixel information group configuring a 2D-viewable planar regular image;
   planar regular image storing unit that stores the pixel information group configuring the converted planar regular image;
   object recognizing unit that recognizes one or multiple specific objects displayed on the converted planar regular image;
   selection-instruction receiving unit that receives an instruction of selecting pixel information corresponding to an arbitrary point on the recognized object per recognized object;
   corresponding coordinate specifying unit that specifies pixel information on a distorted circular image corresponding to the pixel information on the selection-instructed planar regular image per recognized object;
   reconverting unit that reconverts the stored pixel information group configuring the distorted circular image into a pixel information group configuring a 2D-viewable planar regular image about the pixel information specified by the corresponding coordinate specifying unit per recognized object;
   screen information generating unit that generates the pixel information group configuring the reconverted planar regular image as screen information having a predetermined size to be displayed on a displaying part per recognized object; and
   outputting unit that outputs the generated screen information to the terminal device.

8. The conference system according to claim 7, wherein the camera is arranged such that a wide-angle lens or omnidirectional mirror mounted on the camera is faced upward.

9. A monitoring system comprising:
   a monitoring camera mounting thereon a function of outputting a subject photographed by a wide-angle lens or omnidirectional mirror within a predetermined photographing range from a first photographing center as a distorted circular image to an image processing apparatus and
   a function of outputting a subject photographed by a lens group comprising a zoom mechanism within a predetermined range from a second photographing center as a planar regular image to the image processing apparatus; and
   the image processing apparatus for generating screen information based on the input distorted circular image,
   wherein the monitoring camera comprises:
   pan/tilt driving unit that switches a photographing position of the camera, and
   the image processing apparatus comprises:
   distorted circular image storing unit that stores a pixel information group configuring the distorted circular image generated based on the input distorted circular image;
   converting unit that converts the stored pixel information group configuring the distorted circular image into a pixel information group configuring a 2D-viewable planar regular image;
   planar regular image storing unit that stores the pixel information group configuring the converted planar regular image;
   object recognizing unit that recognizes an object displayed on the converted planar regular image;
   selection-instruction receiving unit that receives an instruction of selecting pixel information corresponding to an arbitrary point on the stored planar regular image;
   corresponding coordinate specifying unit that specifying pixel information on a distorted circular image corresponding to the pixel information on the selection-instructed planar regular image; and
   position controlling unit that calculates distance information for newly setting the second photographing center at a position indicated by the pixel information specified by the corresponding coordinate specifying unit based on the previously-calculated first photographing center and second photographing center, and outputting a control signal for driving a monitoring camera to a position indicated by the distance information to the pan/tilt driving unit.

10. An image processing method in an image processing apparatus, comprising:
   a distorted circular image storing step of storing a pixel information group configuring a distorted circular image generated based on the externally-input distorted circular image photographed by a wide-angle lens or omnidirectional mirror;
   a converting step of converting the stored pixel information group configuring the distorted circular image into a pixel information group configuring a 2D-viewable planar regular image;
   a planar regular image storing step of storing the pixel information group configuring the converted planar regular image;
   a selection-instruction receiving step of receiving an instruction of selecting pixel information corresponding to an arbitrary point on the stored planar regular image;
   a corresponding coordinate specifying step of specifying pixel information on a distorted circular image corresponding to the pixel information on the selection-instructed planar regular image; and
   a reconverting step of reconverting the stored pixel information group configuring the distorted circular image into a pixel information group configuring a 2D-viewable planar regular image about the pixel information specified by the corresponding coordinate specifying step.

11. A non-transitory computer-readable storage medium that stores a computer-image processing program, the image processing program causing a computer to execute:
   a distorted circular image storing step of storing a pixel information group configuring a distorted circular image generated based on the externally-input distorted circular image photographed by a wide-angle lens or omnidirectional mirror;
   a converting step of converting the stored pixel information group configuring the distorted circular image into a pixel information group configuring a 2D-viewable planar regular image;
   a planar regular image storing step of storing the pixel information group configuring the converted planar regular image;
   a selection-instruction receiving step of receiving an instruction of selecting pixel information corresponding to an arbitrary point on the stored planar regular image;
   a corresponding coordinate specifying step of specifying pixel information on a distorted circular image corresponding to the pixel information on the selection-instructed planar regular image; and
   a reconverting step of reconverting the stored pixel information group configuring the distorted circular image into a pixel information group configuring a 2D-viewable planar regular image about the pixel information specified by the corresponding coordinate specifying step.

* * * * *